(12) United States Patent
Mujumdar et al.

(10) Patent No.: US 12,531,781 B2
(45) Date of Patent: Jan. 20, 2026

(54) METHODS AND APPARATUS FOR MANAGING AN ENVIRONMENT WITHIN A DOMAIN

(71) Applicant: Telefonaktiebolaget LM Ericsson (publ), Stockholm (SE)

(72) Inventors: Anusha Pradeep Mujumdar, Bangalore (IN); Ezeddin Al Hakim, London (GB); Filippo Vannella, Stockholm (SE); Alexandros Nikou, Danderyd (SE); Hassam Riaz, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 339 days.

(21) Appl. No.: 18/279,015

(22) PCT Filed: Mar. 9, 2021

(86) PCT No.: PCT/EP2021/055926
§ 371 (c)(1),
(2) Date: Aug. 25, 2023

(87) PCT Pub. No.: WO2022/188957
PCT Pub. Date: Sep. 15, 2022

(65) Prior Publication Data
US 2024/0195689 A1 Jun. 13, 2024

(51) Int. Cl.
*H04L 41/00* (2022.01)
*H04L 41/0823* (2022.01)
*H04W 24/02* (2009.01)

(52) U.S. Cl.
CPC ......... *H04L 41/0823* (2013.01); *H04W 24/02* (2013.01)

(58) Field of Classification Search
CPC .......................... H04L 41/0823; H04W 24/02
See application file for complete search history.

(56) References Cited

U.S. PATENT DOCUMENTS

| 11,004,011 B2 * | 5/2021 | Ghavamzadeh ... G06Q 30/0241 |
| 11,783,006 B1 * | 10/2023 | Prieditis ................. G16H 50/20 |
| | | 702/1 |

(Continued)

OTHER PUBLICATIONS

International Search Report and Written Opinion of the International Searching Authority, PCT/EP2021/055926, mailed Apr. 30, 2021, 10 pages.

(Continued)

*Primary Examiner* — Erika A Washington
(74) *Attorney, Agent, or Firm* — Sage Patent Group

(57) ABSTRACT

Computer implemented methods are disclosed for managing, and for facilitating management of an environment within a domain, the environment being operable to perform a task. The management method includes for each of a plurality of possible actions that may be executed on the environment in a current state of the environment, obtaining a risk contour and predicted reward associated with the possible action. The method further includes selecting, from among the possible actions and on the basis of the risk contours and predicted reward, an action for execution on the environment, and initiating execution of the selected action. A risk contour associated with a possible action includes probabilities of the environment entering possible future states on execution of the action, confidence values associated with the probabilities, and for the possible future states, a representation of a domain level consequence of the environment entering the possible future state.

20 Claims, 21 Drawing Sheets

(56) References Cited

U.S. PATENT DOCUMENTS

2019/0014487 A1 1/2019 Yang et al.
2019/0014488 A1 1/2019 Tan et al.
2020/0065495 A1 2/2020 Nag et al.
2020/0150672 A1 5/2020 Naghshvar et al.

OTHER PUBLICATIONS

Alshiekh, Mohammed et al., "Safe Reinforcement Learning via Shielding," arXiv:1708.08611v2, Sep. 3, 2017, 23 pages.
Lauer, Martin et al., "An Algorithm for Distributed Reinforcement Learning in Cooperative Multi-agent Systems," International Conference on Machine Learning (ICML), 2000, 8 pages.
Nadiger, Chetan et al., "Federated Reinforcement Learning for Fast Personalization," 2019 IEEE International Conference on Artificial Intelligence and Knowledge Engineering (AIKE), 5 pages.
Serrano-Cuevas, Jonathan et al., "Safe reinforcement learning using risk mapping by similarity," Adaptive Behavior, 2019, 12 pages.
Communication pursuant to Article 94(3) EPC for European Patent Application No. 21711820.7 mailed Sep. 9, 2025, 7 pages.
Feghhi, Saman et al., "Safe Reinforcement Learning for Antenna Tilt Optimisation using Shielding and Multiple Baselines," arXiv. 2012.01296v1 (Dec. 2020), 6 pages.

\* cited by examiner

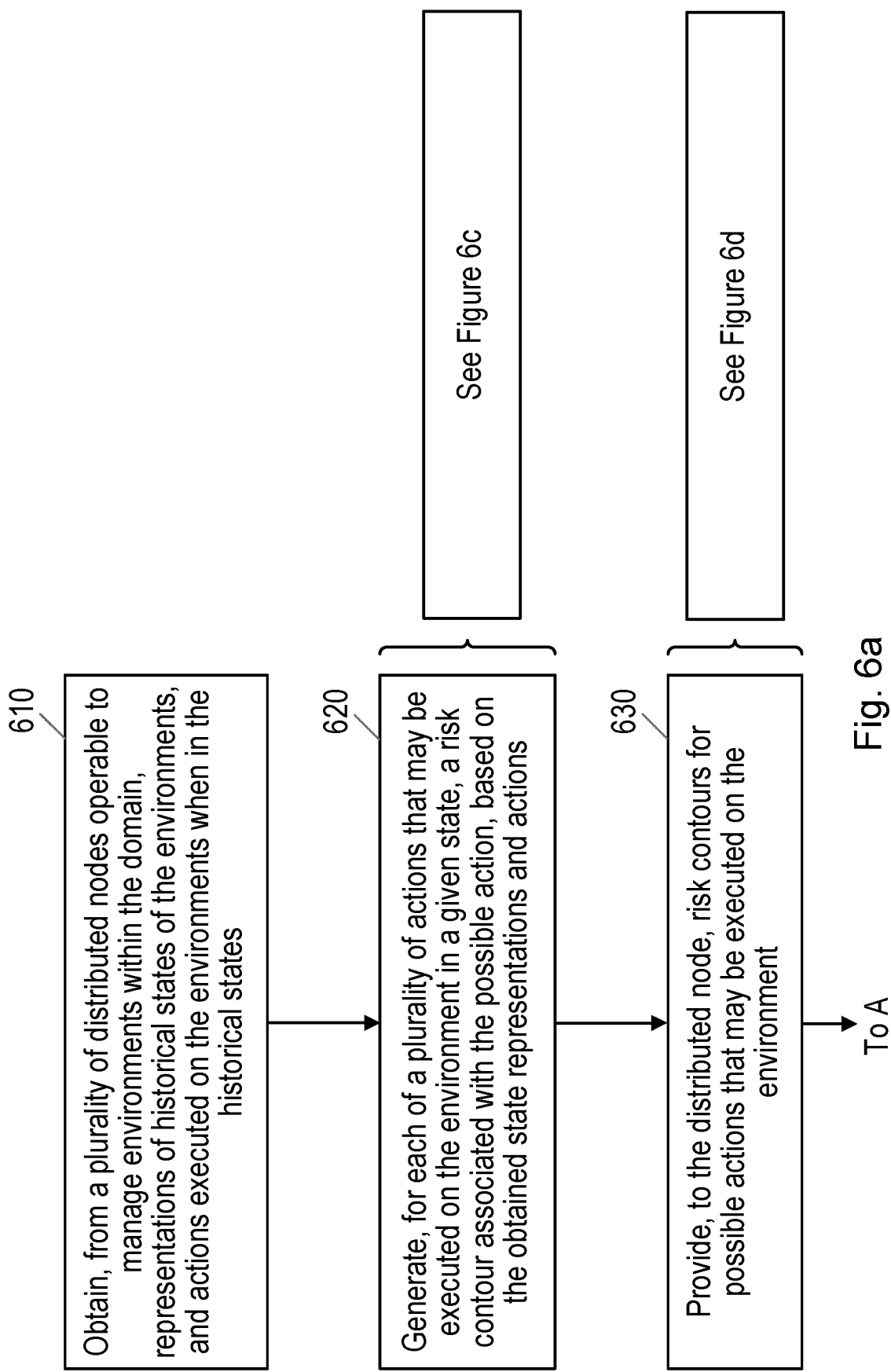

METHODS AND APPARATUS FOR MANAGING AN ENVIRONMENT WITHIN A DOMAIN

CROSS REFERENCE TO RELATED APPLICATIONS

This application is a 35 U.S.C. § 371 national stage application of PCT International Application No. PCT/EP2021/055926 filed on Mar. 9, 2021, the disclosure and content of which is incorporated by reference herein in its entirety.

TECHNICAL FIELD

The present disclosure relates to computer implemented methods for managing, and for facilitating management of an environment within a domain, the environment being operable to perform a task. The present disclosure also relates to a distributed node, a server node, and to a computer program product operable to carry out such methods.

BACKGROUND

Reinforcement Learning (RL) is a decision-making framework in which an agent interacts with an environment by exploring its states and selecting actions to be executed on the environment. Actions are selected with the aim of maximising the long-term return of the actions according to a reward signal. More formally, an RL problem is defined by:

- The state space S: which is the set of all possible states in which the environment may exist,
- The action space A: which is the set of all possible actions which may be executed on the environment,
- The transition probability distribution P: which is the probability of transitioning from one state to another based on an action selected by the agent,
- The reward distribution R: which incentivizes or penalizes specific state-action pairs.

The agent's policy $\pi$, defines the control strategy implemented by the agent, and is a mapping from states to a policy distribution over possible actions, the distribution indicating the probability that each possible action is the most favourable given the current state. An RL interaction proceeds as follows: at each time instant t, the agent finds the environment in a state $s_t \in S$. The agent selects an action $a_t \sim \pi(\cdot|s_t) \in A$, receives a stochastic reward $r_t \sim R(\cdot|s_t, a_t)$, and the environment transitions to a new state $s_{t+1} \sim P(\cdot|s_t, a_t)$. The agent's goal is to find the optimal policy, i.e. a policy that maximizes the expected cumulative reward over a predefined period of time, also known as the policy value function $$V^\pi(s) = \mathbb{E}_\pi\left[\sum_{i=0}^{\infty} \gamma^i r_{t+i} \mid s_t = s\right].$$

While executing the above discussed dynamic optimisation process in an unknown environment (with respect to transition and reward probabilities), the RL agent needs to try out, or explore, different state-action combinations with sufficient frequency to be able to make accurate predictions about the rewards and the transition probabilities of each state-action pair. It is therefore necessary for the agent to repeatedly choose suboptimal actions, which conflict with its goal of maximizing the accumulated reward, in order to sufficiently explore the state-action space. At each time step, the agent must decide whether to prioritize further gathering of information (exploration) or to make the best move given current knowledge (exploitation). Exploration may create opportunities by discovering higher rewards on the basis of previously untried actions. However, exploration also carries the risk that previously unexplored decisions will not provide increased reward, and may instead have a negative impact on the environment. This negative impact may only be short term or may persist, for example if the explored actions place the environment in an undesirable state from which it does not recover.

In the context of RL, an optimal policy is usually derived in a trial-and-error fashion by direct interaction with the environment and, as mentioned above, in the course of such interaction, the agent will explore suboptimal regions of the state-action space. In many technical domains and real-world use cases, this suboptimal exploration may result in unacceptable performance degradation, risk taking, or breaching of safety regulations.

Consequently, the standard approach for RL solutions is to employ a simulator as a proxy for the real environment during the training phase, thus allowing for unconstrained exploration without concern for performance degradation. However, simulators are often subject to modelling errors related to inherent environment stochasticity, and this calls into question their reliability for training an RL agent policy that will be deployed into the real world.

Significant research has been directed to the challenge of addressing the risk of unacceptable performance degradation in RL agent training, and to circumventing the issue of inaccurate simulations, resulting in the development of Safe Reinforcement Learning (SRL) techniques.

One approach to SRL is to introduce safety shields, as proposed in M. Alshiekh et al. in the article "Safe reinforcement learning via shielding", AAAI 2018, https://arxiv.org/pdf/1708.08611.pdf. This article suggests filtering out unsafe actions that are proposed by the RL agent before they can be executed on the environment. Safety shields can ensure that the Exploration remains within a safe region or safe regions of the state-action space. Particularly promising are those approaches that can take symbolic specifications of safety and ensure that states violating those specifications are not visited (during training or prediction). Safety shields allow for domain knowledge definition of safe behavior, and consequently block actions that can lead the system to unsafe states.

However, it is difficult to extend techniques such as safety shields for execution in a distributed learning situation. Distributed RL techniques can be very powerful as they enable efficient computation of policies in large state spaces, and have found recent application in use cases such as cell-shaping and Remote Electronic Tilt optimization in cellular communication networks. The safety implications for large scale distributed learning systems are considerable, but there are currently limited options for implementing SRL in such systems. Although safe RL has been studied in multi-agent systems, the focus has generally been on adding hard constraints that need to be satisfied for safety, and consequently may overly limit performance and are difficult to scale. Some other works on safe distributed RL focus on interruption by humans to prevent unsafe behavior.

SUMMARY

It is an aim of the present disclosure to provide a method, management node, and computer readable medium which at least partially address one or more of the challenges discussed above. It is a further aim of the present disclosure to provide a method, management node and computer readable medium which cooperate to implement a safe Reinforcement Learning process in a distributed environment.

According to a first aspect of the present disclosure, there is provided a computer implemented method for managing an environment within a domain, the environment being operable to perform a task. The method, performed by a distributed node, comprises obtaining a representation of a current state of the environment. The method further comprises, for each of a plurality of possible actions that may be executed on the environment in its current state, using a Reinforcement Learning, RL, process to obtain predicted values of a reward function representing possible impacts of execution of the possible action on performance of the task by the environment, and obtaining a risk contour associated with the possible action. The method further comprises selecting, from among the possible actions and on the basis of the obtained predicted values of the reward function and risk contours, an action for execution on the environment, and initiating execution of the selected action on the environment. A risk contour associated with a possible action comprises probabilities of the environment entering possible future states on execution of the action, confidence values associated with the probabilities, and for the possible future states, a representation of a domain level consequence of the environment entering the possible future state.

According to another aspect of the present disclosure, there is provided a computer implemented method for facilitating management of an environment within a domain, the environment being operable to perform a task. The method, performed by a server node, comprises obtaining, from a distributed node operable to manage the environment within the domain, representations of historical states of the environment, and actions executed on the environment when in the historical states. The method further comprises generating, for each of a plurality of actions that may be executed on the environment in a given state, a risk contour associated with the possible action, based on the obtained state representations and actions, and providing, to the distributed node, risk contours for possible actions that may be executed on the environment. A risk contour associated with a possible action comprises probabilities of the environment entering possible future states on execution of the action, confidence values associated with the probabilities, and for the possible future states, a representation of a domain level consequence of the environment entering the possible future state.

According to another aspect of the present disclosure, there is provided a computer program product comprising a computer readable medium, the computer readable medium having computer readable code embodied therein, the computer readable code being configured such that, on execution by a suitable computer or processor, the computer or processor is caused to perform a method according to any one or more of aspects or examples of the present disclosure.

According to another aspect of the present disclosure, there is provided a distributed node for managing an environment within a domain, the environment being operable to perform a task. The distributed node comprises processing circuitry configured to cause the distributed node to obtain a representation of a current state of the environment. The processing circuitry is further configured to cause the distributed node to, for each of a plurality of possible actions that may be executed on the environment in its current state, use a Reinforcement Learning, RL, process to obtain predicted values of a reward function representing possible impacts of execution of the possible action on performance of the task by the environment, and obtain a risk contour associated with the possible action. The processing circuitry is further configured to cause the distributed node to select, from among the possible actions and on the basis of the obtained predicted values of the reward function and risk contours, an action for execution on the environment, and initiating execution of the selected action on the environment. A risk contour associated with a possible action comprises probabilities of the environment entering possible future states on execution of the action, confidence values associated with the probabilities, and for the possible future states, a representation of a domain level consequence of the environment entering the possible future state.

According to another aspect of the present disclosure, there is provided a server node for facilitating management of an environment within a domain, the environment being operable to perform a task. The server node comprises processing circuitry configured to cause the server node to obtain, from a distributed node operable to manage the environment within the domain, representations of historical states of the environment, and actions executed on the environment when in the historical states. The processing circuitry is further configured to cause the server node to generate, for each of a plurality of actions that may be executed on the environment in a given state, a risk contour associated with the possible action, based on the obtained state representations and actions, and provide, to the distributed node, risk contours for possible actions that may be executed on the environment. A risk contour associated with a possible action comprises probabilities of the environment entering possible future states on execution of the action, confidence values associated with the probabilities, and for the possible future states, a representation of a domain level consequence of the environment entering the possible future state.

Examples of the present disclosure thus propose methods and nodes that facilitate safe RL in distributed systems. Risk contours encapsulate the probabilities of entering different states, confidence levels associated with the probabilities, and domain level consequences of entering the states. The provision of risk contours to distributed nodes enriches the information obviable to such nodes, enabling the distributed nodes to balance exploration, performance optimisation and safety in the management of environments.

For the purposes of the present disclosure, the term "ML model" encompasses within its scope the following concepts:

Machine Learning algorithms, comprising processes or instructions through which data may be used in a training process to generate a model artefact for performing a given task, or for representing a real world process or system;

the model artefact that is created by such a training process, and which comprises the computational architecture that performs the task; and the process performed by the model artefact in order to complete the task.

References to "ML model", "model", model parameters", "model information", etc., may thus be understood as relating to any one or more of the above concepts encompassed within the scope of "ML model".

BRIEF DESCRIPTION OF THE DRAWINGS

For a better understanding of the present disclosure, and to show more clearly how it may be carried into effect, reference will now be made, by way of example, to the following drawings in which:

FIGS. 6a to 6d show flow charts illustrating process steps in another example of a computer implemented method for facilitating management of an environment within a domain;

FIG. 11 illustrates functional modules in another example of distributed node;

DETAILED DESCRIPTION

Examples of the present disclosure introduce the concept of a risk contour. A risk contour provides information that encompasses both probabilities of an environment entering possible future states on execution of a given action, and domain level consequences of the environment entering the possible future states. In the following discussion, the domain level consequence of entering a possible future state is referred to as a hazard, or impact, of the possible future state. The introduction of the concept of a risk contour offers the possibility for distributed nodes to independently manage a trade-off between exploration of a state action space and the requirements of safe behavior.

According to examples of the present disclosure, states, actions, rewards and a model may be provided from a distributed node that is managing an environment to a server node. The states, actions etc. may be provided after initiation or selection of a new action (every step), or periodically, (for example every episode). The server node collects state action pairs from a plurality of distributed nodes, and creates or updates the risk contours for a full state-action model. These risk contours are then provided to distributed nodes. The risk contours may be provided to distributed nodes periodically, on demand, or according to some other schedule or trigger. In some examples, risk contours for the full state action model may be provided, or only some risk contours, for example corresponding to a threshold number of next steps for individual distributed nodes. Exploration of state space regions which have not so far been thoroughly explored may be incentivized by the server node through the inclusion of a confidence score in the risk contours. The confidence score may provide an indication of the confidence associated with the probabilities of transitioning to a given future state on execution of an action. A confidence score may be used by the distributed nodes to calculate an exploration bonus, which bonus increases with decreasing confidence in action probabilities. On the basis of a current environment state representation, and on the basis of the provided risk contours, distributed nodes may independently select actions for execution. Action selection may be performed using a policy F that is aware of the risk contours and accounts for probability of transitioning to a next state (risk), domain level consequence (hazard), expected reward from next states (reward), and incentive to explore new areas of the state-action space (exploration bonus):

F(risk, hazard, reward, exploration_bonus)→action_selection

Figure 1:
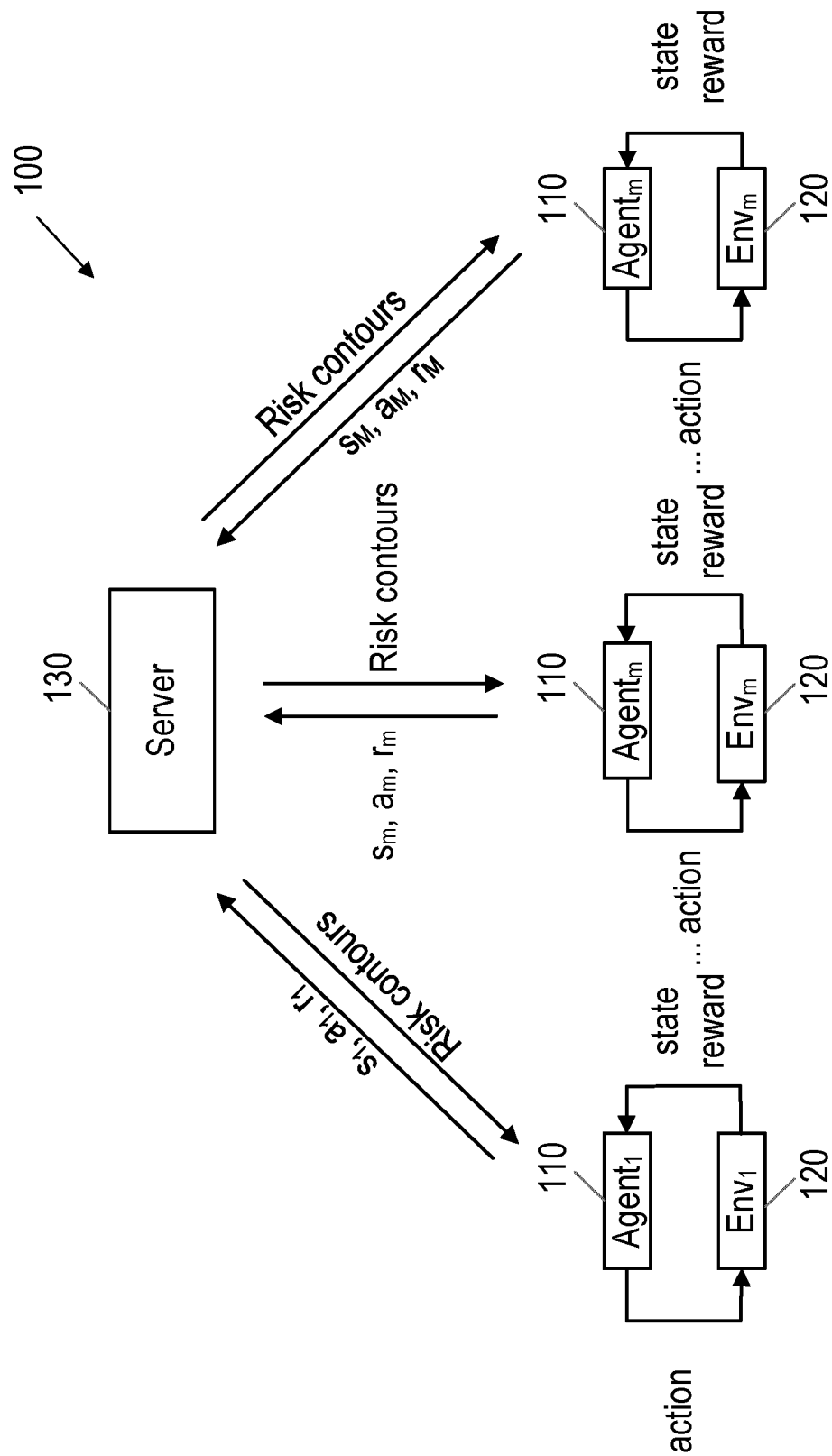
FIG. 1 illustrates a distributed learning system.

In order to provide additional context for the methods and nodes proposed herein, there now follows a more detailed discussion of distributed RL systems and safety shields. FIG. 1 illustrates a distributed RL system comprising M RL agents 110, each agent m learning its policy by interacting with an environment 120 that it manages $Env_m$. It is assumed that each agent m 110 is able to communicate with a cloud server node 130. The advantages of a distributed system such as the system 100 include efficient computation and larger state-space exploration. Federated RL is a special case of the distributed RL system illustrated in FIG. 1, in which the Server node 130 creates a global model by aggregating the local RL models.

A Safety shield can be envisaged as a function restricting the action space to a set of safe actions that can be selected by an agent, i.e. shield(s,a)={allowed actions in s}, or shield(s,a)=a−{blocked actions in s}.

Different options exist for directly incorporating a safety shield approach into distributed RL. In a first, local placement approach, a shield is placed at every state at which an agent m takes any action towards the environment $Env_m$. This approach is guaranteed safe but would prevent a high degree of exploration of the state space in $Env_m$. In a Federated RL system, this restriction of exploration will eventually come to affect the accuracy of the global model, owing to insufficient exploration of the state-action space. In a second, global placement approach, a shield is placed when the global server model is provided to the distributed nodes, allowing the global model to include only safe actions. The server node effectively prunes out unsafe actions before the model is provided to the distributed nodes, meaning the distributed nodes can only see those actions which are safe at a given state. This approach limits the exploration available to the individual distributed nodes, and many states may never be visited owing to the pruning of various actions. For models having a relatively low confidence regarding state transitions on execution of actions, this lack of exploration can be particularly problematic.

Examples of the present disclosure address the above discussed limitations of local and global shields for distributed RL through the introduction of risk contours, which encode both the probability of transitioning into states as well as a domain level consequence (hazard) of entering the states. The risk contour concept is illustrated in the following discussion in the context of the above mentioned Remote Electronic Tilt optimization use case for cellular communication networks.

Remote Electronic Tilt optimization is a problem to which RL has been successfully applied. In order to be able efficiently to provide a high level of Quality of Service (QoS) to users, networks must adjust their configuration in an automatic and timely manner. Antenna vertical tilt angle, referred to as downtilt angle, is one of the most important variables to control for QoS management. The problem is to adjust the antenna tilt for each individual cell in light of a plurality of cell and user locations as well as the current antenna tilts of neighbouring cells. The objective is to maximize some trade-off between capacity (for example total cell throughput) and coverage (for example $5^{th}$ percentile user throughput). In this example use case, the environment state comprises representative Key Performance Indicators (KPIs) of each cell. The actions available are to tilt-up (a1), tilt-down (a2) or no-change (a3). The reward is given by the environment, and is modelled as a weighted sum of capacity, coverage and quality KPIs.

It may be envisaged that states which are considered to be "unsafe" correspond to unacceptable values of a high-level KPI such as accessibility. Using the concept of risk contours, such unsafe states can be associated with a hazard score which quantifies this negative consequence of entering the unsafe state. The hazard value can be independent of the reward that may be generated for the state by a reward function, and may be calculated at the domain level, for example on the basis of a Service Level Agreement (SLA), or contractual document. For example, if falling below a threshold of 95% accessibility is associated in an SLA with a financial or other penalty, then states having accessibility below 95% may be associated with a large hazard score, with the value of the hazard score being set in combination with quantitative values for confidence and reward parameters, such that states which are to be avoided at almost any cost are associated with a hazard value that will outweigh other factors to be considered in action selection, ensuring that these states will not be entered. In order to balance the conflicting requirements of safety and exploration, a risk contour may also include a confidence value associated with a probability of entering a state on execution of an action. State action pairs that have not been visited very frequently will have a low confidence score, which may generate a correspondingly high exploration bonus to incentivize further exploration. In summary, a risk contour is a function $S \times A \times S' \rightarrow$ [risk; hazard; confidence]. In the case of finite state-action space (tabular RL) the risk contour can be represented by a table.

Figure 2:
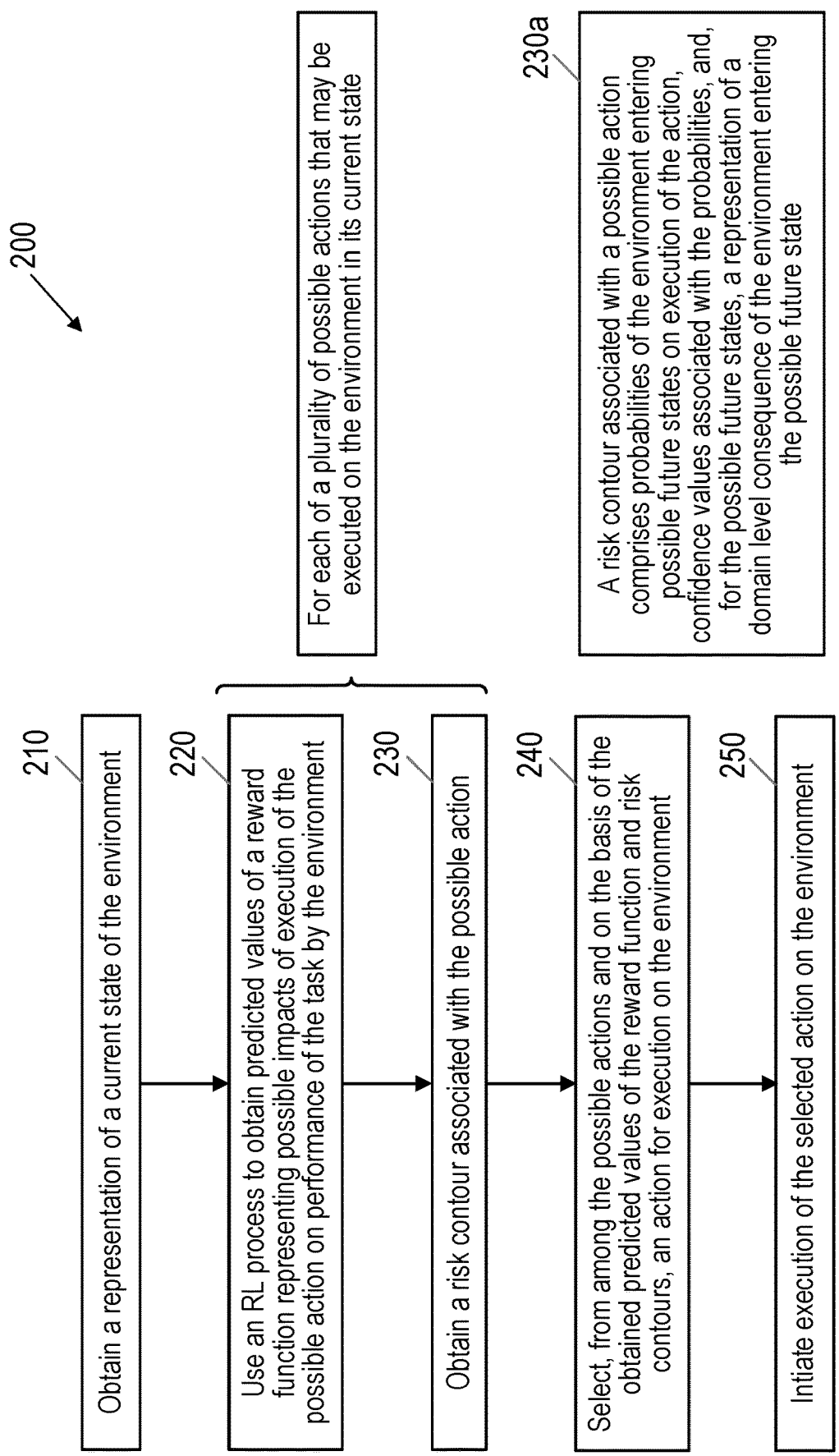
FIG. 2 is a flow chart illustrating process steps in a computer implemented method for managing an environment within a domain.

FIG. 2 is a flow chart illustrating process steps in a computer implemented method for managing an environment within a domain, the environment being operable to perform a task. The method 200 is performed by a distributed node, which may comprise a physical or virtual node, and may be implemented in an apparatus and/or in a virtualized environment, for example in a cloud or fog deployment. In the case of an environment comprising a part of a communication network, the distributed node may comprise or be instantiated in any part of a logical core network node, network management centre, network operations centre, Radio Access Network node etc. Any such communication network node may itself be divided between several logical and/or physical functions, and any one or more parts of the distributed node may be instantiated in one or more logical or physical functions of a communication network node. A Radio Access Network Node may comprise a base station, eNodeB, gNodeB, or any other current of future implementation of functionality facilitating the exchange of radio network signals between nodes and/or users of a communication network.

Referring to FIG. 2, the method 200 comprises, in a first step 210, obtaining a representation of a current state of the environment. The method 200 then comprises, for each of a plurality of possible actions that may be executed on the environment in its current state, using a Reinforcement Learning (RL) process to obtain predicted values of a reward function representing possible impacts of execution of the possible action on performance of the task by the environment, in step 220. The method also comprises obtaining a risk contour associated with each of the plurality of possible actions at step 230. At step 240, the method 200 comprises selecting, from among the possible actions and on the basis of the obtained predicted values of the reward function and risk contours, an action for execution on the environment. Finally, at step 250, the method 200 comprises initiating execution of the selected action on the environment. As illustrated at 230a, a risk contour associated with a possible action comprises probabilities of the environment entering possible future states on execution of the action, confidence values associated with the probabilities, and, for the possible future states, a representation of a domain level consequence of the environment entering the possible future state.

The method 200 demonstrates a risk contours based approach that may be implemented at a distributed node, allowing the distributed node to manage the trade-off between exploration of the state-action space for its managed environment with the requirement to respect safety constraints. The probability of entering different future states on the basis of possible actions, the confidence values associated with those probabilities, and the domain level consequence of entering the future states allow the distributed node to make a judgement that favours exploration without risking entering states that will have significant negative consequences at the domain level. As discussed above, the domain level consequence may be quantified on the basis of an SLA or other contractual document, or any other requirements specification for performance of the task that the environment is operable to perform. In the case of an environment that is part of a communication network, the task may be provision of communication network services, and the domain level consequence may be established based on a specification of requirements for service provision and service performance.

FIGS. 3a to 3g show flow charts illustrating another example of a computer implemented method for managing an environment within a domain, the environment being operable to perform a task. As for the method 200 discussed above, the method 300 is performed by a distributed node, which may comprise a physical or virtual node, and may be implemented in an apparatus and/or in a virtualized environment, for example in a cloud or fog deployment. The method 300 illustrates examples of how the steps of the method 200 may be implemented and supplemented to provide the above discussed and additional functionality.

Figure 3A:
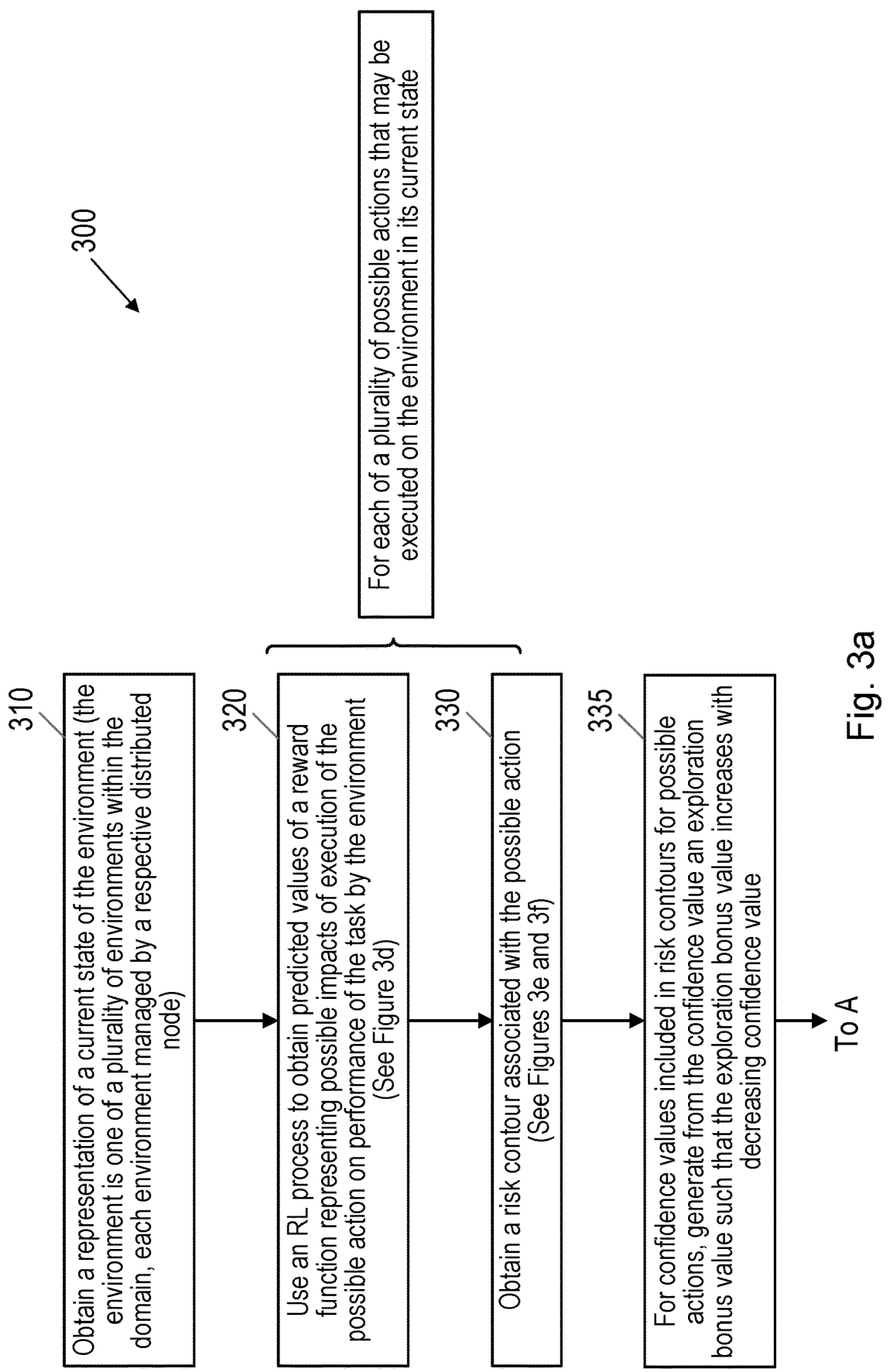
FIG. 3a to 3g show flow charts illustrating process steps in another example of a computer implemented method for managing an environment within a domain.

Referring initially to FIG. 3a, according to the method 300, in a first step 310, the distributed node obtains a representation of a current state of the environment. The representation may for example comprise a vector or matrix of values of parameters describing the environment at a current time. As illustrated at 310, the environment may be one of a plurality of environments within the domain, each environment managed by a respective distributed node. In the context of a communication network, each environment may for exhale comprise a cell, a cell sector, a group of cells, etc. After obtaining the current state representation, the distributed node then performs steps 320 and 330 for each of a plurality of possible actions that may be executed on the environment in its current state. It will be appreciated that the current state may dictate what actions are possible, and the distributed node may determine what actions are possible from the current state representation.

In step 330, the distributed node uses an RL process to obtain predicted values of a reward function representing possible impacts of execution of each possible action on performance of the task by the environment. The reward function may for example be a function of one or more KPIs for the environment and/or the task that it is operable to perform, and the RL process may enable the distributed node to generate predictions for the reward function in the event that a given possible action is selected and executed. Steps that may be involved in using an RL process to obtain predicted values of a reward function at step 330 are illustrated in FIG. 3d, and are described in further detail below.

Figure 3B:
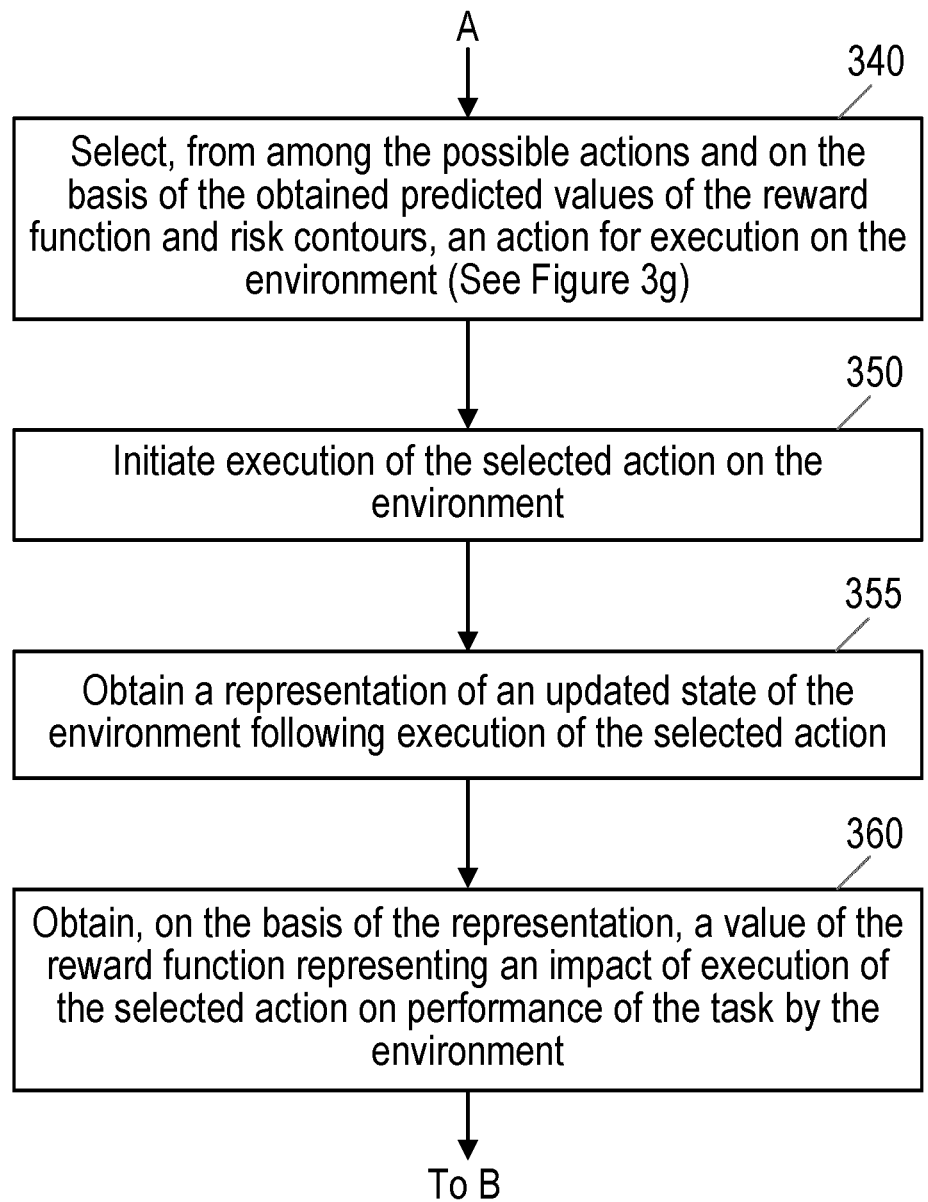
Figure 3C:
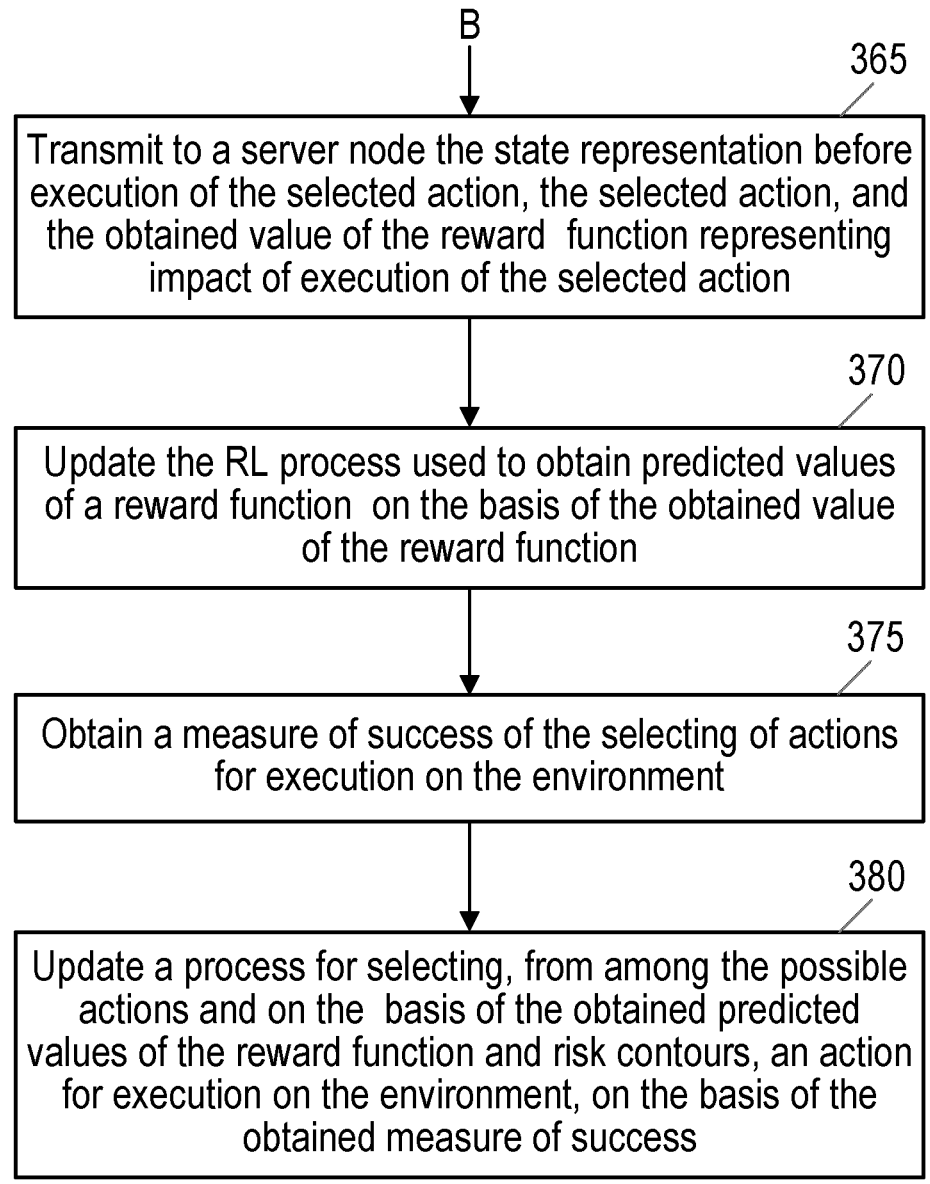
Figure 3D:
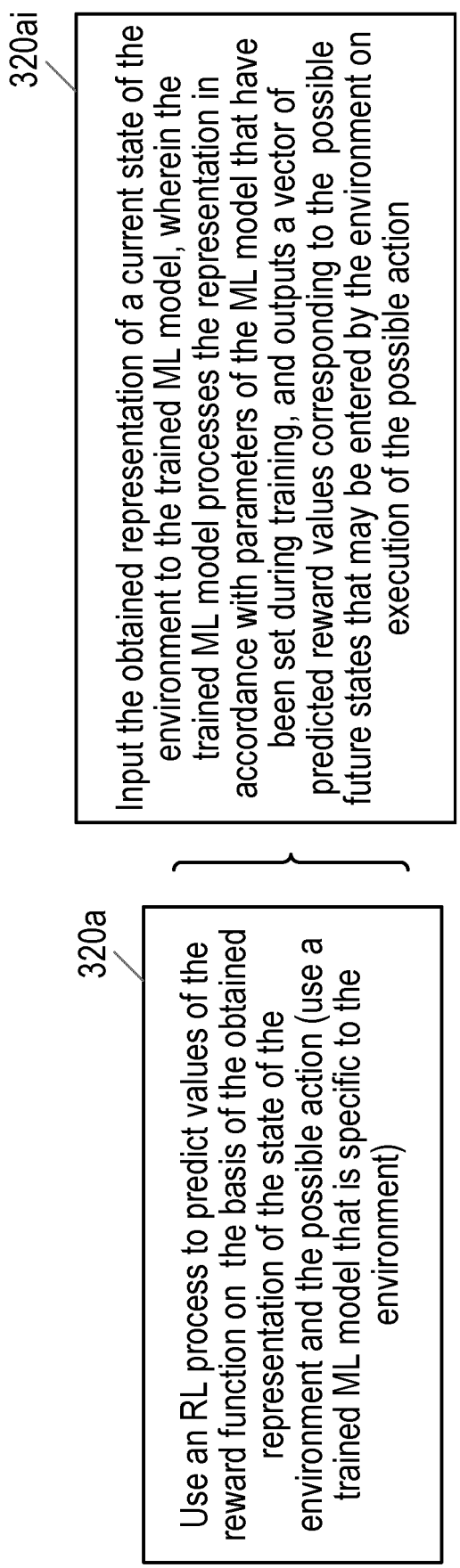

Referring now to FIG. 3d, using an RL process to obtain predicted values of a reward function representing possible impacts of execution of a possible action on performance of the task by the environment may comprise, at step 320a, using the RL process to predict values of the reward function on the basis of the obtained representation of the state of the environment and the possible action. As illustrated at 320a, this may comprise using a trained Machine Learning (ML) model, which model may for example be specific to the environment that is managed by the distributed node. Thus for example, one or more environments within a domain may be associated with different reward functions, and with different models for predicting values of reward functions, such that different distributed nodes may obtain different predicted rewards based on the same possible actions and current state representations. As illustrated at 320ai, using the trained ML model to predict values of the reward function may comprise inputting the obtained representation of a current state of the environment to the trained ML model, wherein the trained ML model processes the representation in accordance with parameters of the ML model that have been set during training, and outputs a vector of predicted reward values corresponding to the possible future states that may be entered by the environment on execution of the possible action.

Figure 3E:
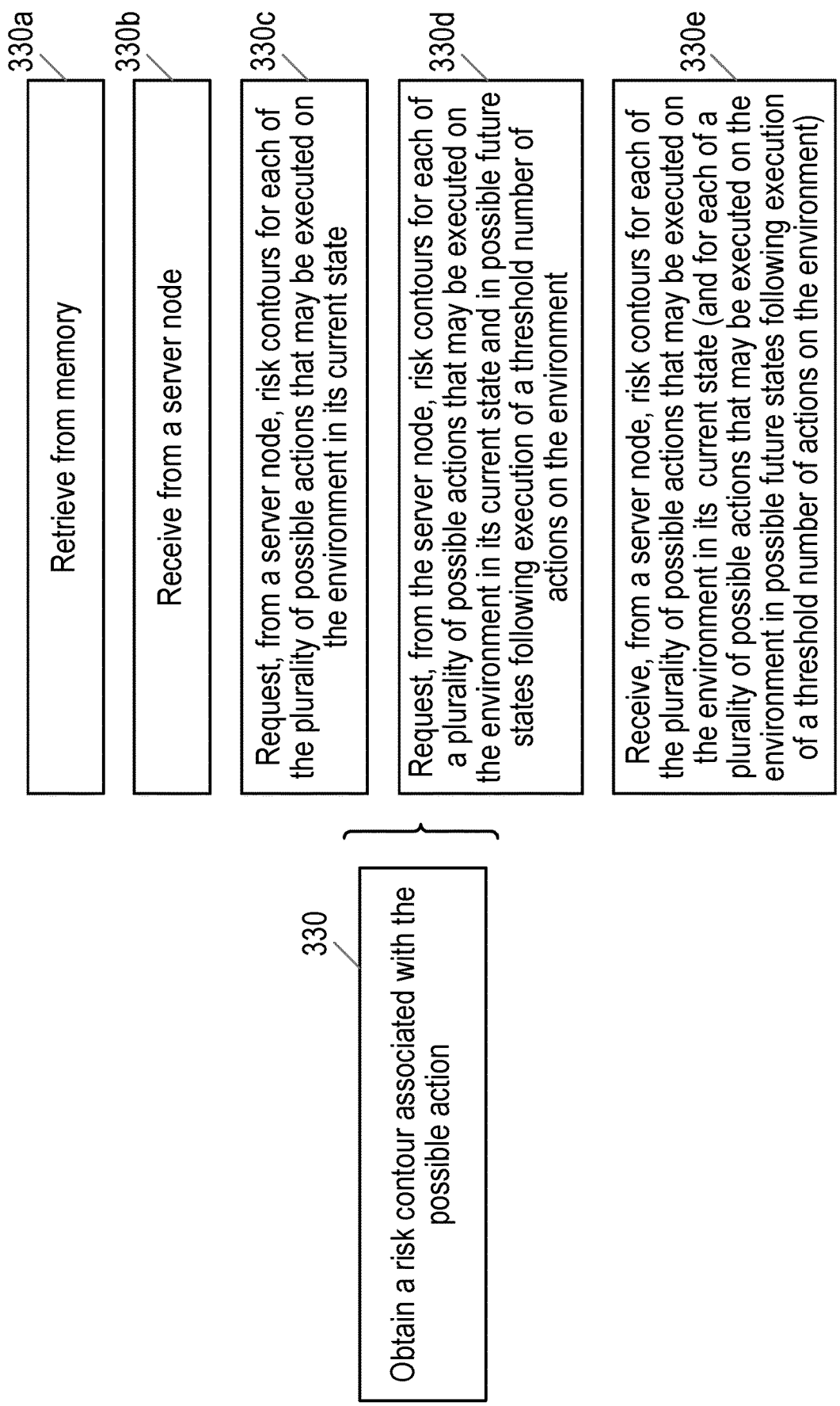

Referring again to FIG. 3a, following obtaining of predicted values of a reward function for possible actions, the distributed node obtains a risk contour associated with each of the plurality of possible actions. As discussed above, a risk contour associated with a possible action comprises probabilities of the environment entering possible future states on execution of the action, confidence values associated with the probabilities, and, for the possible future states, a representation of a domain level consequence of the environment entering the possible future state. FIG. 3e illustrates in greater detail steps that may be performed in order to obtain a risk contour associated with a possible action, and FIG. 3f illustrates in greater detail information that may be included within a risk contour.

Referring now to FIG. 3e, obtaining a risk contour associated with a possible action at step 330 may comprise, at step 330a, retrieving a risk contour from a memory, or at step 330b, receiving a risk contour from a server node. The distributed node may for example receive a plurality of risk contours from a server node, store the received risk contours in a memory and, in later iterations of the method 300, retrieve previously received risk contours for a possible action from the memory. In some examples, the distributed node may request risk contours from a server node. As illustrated at 330c, the distributed node may request, from the server node, risk contours for each of the plurality of possible actions that may be executed on the environment in its current state. In some examples, the distributed node may use a state action model to determine what actions are possible in the current state of the environment. As illustrated at 330d, the distributed node may request, from the server node, risk contours for each of the plurality of possible actions that may be executed on the environment in its current state and for each of a plurality of possible actions that may be executed on the environment in possible future states following execution of a threshold number of actions on the environment. Thus, the distributed node may request risk contours for a threshold number of future actions. For a threshold number k, the distributed node may therefore request risk contours for a k-action distance from its current state action space. At step 330e, the distributed node may receive risk contours, which may correspond to the requested risk contours, or may be decided by the server node. This is, the distributed node may receive risk contours for each of the plurality of possible actions that may be executed on the environment in its current state and, may additionally receive risk contours for each of a plurality of possible actions that may be executed on the environment in possible future states following execution of a threshold number of actions on the environment. In some examples of the present disclosure, the threshold number of actions may encompass the entire state action space for the environment. In some examples of the present disclosure, a request for risk contours may be implicit in the provision of an updated state representation, action and reward later in the method 300. For example, in a critical use case for which updated risk contours are to be provided after every action step, receipt by a server node of state representation, action and reward following step 365 discussed below may be interpreted as a request for updated risk contours.

Figure 3F:
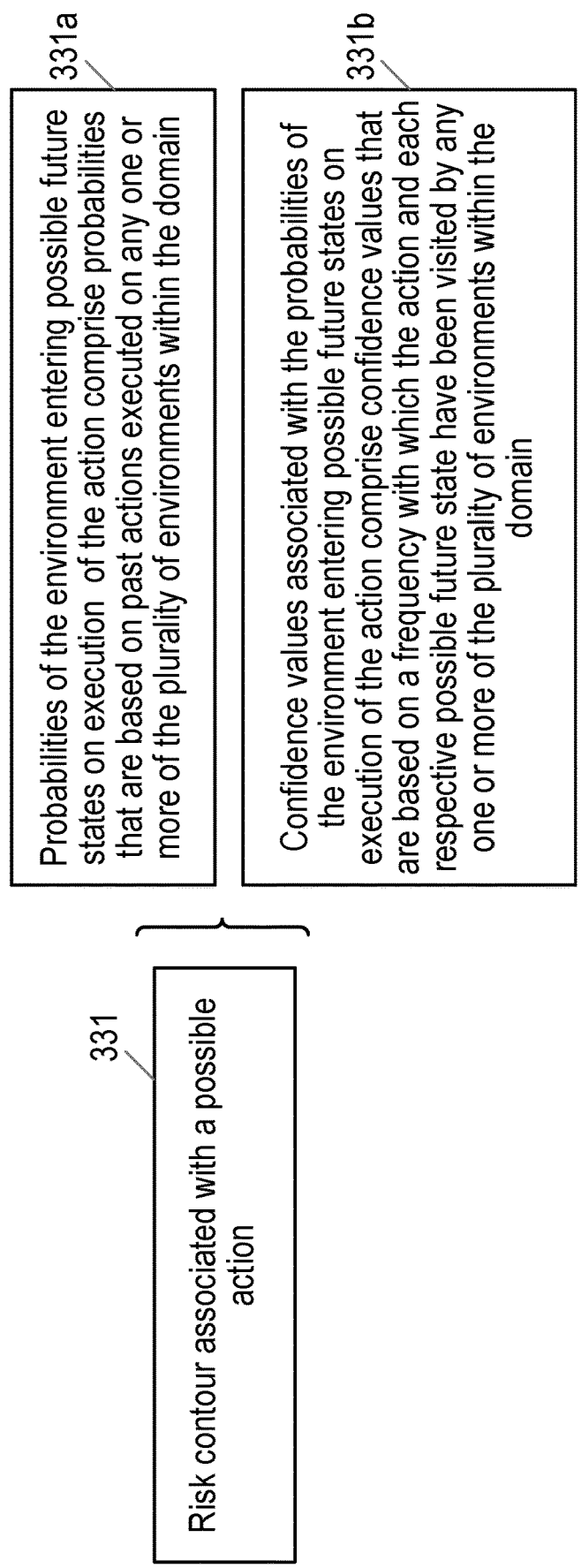

Referring now to FIG. 3f, in a risk contour 331 associated with a possible action, the probabilities of the environment entering possible future states on execution of the action may comprise, as illustrated at 331a, probabilities that are based on past actions executed on any one or more of the plurality of environments within the domain. Additionally, the confidence values associated with the probabilities of the environment entering possible future states on execution of the action with which the risk contour is associated may comprise, as illustrated at 331b, confidence values that are based on a frequency with which the action and each respective possible future state have been visited by any one or more of the plurality of environments within the domain. It will be appreciated that the risk contours may therefore include learning based on experience from multiple environments and distributed nodes. Provision of such risk contours to individual distributed nodes may therefore transfer such learning between environments, and consequently improve overall performance of the environments within the domain.

Referring again to FIG. 3a, having obtained predicted values of the reward function and risk contours for the possible actions that may be executed on the environment in its current state, the distributed node proceeds to generate exploration bonus values at step 335. As illustrated in FIG. 3a, this comprises, for confidence values included in risk contours for possible actions, generating from the confidence value an exploration bonus value, such that the exploration bonus value increases with decreasing confidence value. Different options may be envisaged for generating exploration bonuses from confidence values, such that the exploration bonus value increases with decreasing confidence value. For example, the exploration bonus may comprise a function of the inverse of the confidence value, such as a log or exponent of the inverse of the confidence value. In another example, if the confidence value is a fraction, the exploration bonus may be obtained by subtracting the confidence value from 1.

Referring now to FIG. 3b, in step 340, the distributed node selects, from among the possible actions and on the basis of the obtained predicted values of the reward function and risk contours, an action for execution on the environment. Steps that may be involved in selecting an action for execution on the environment at step 340 are illustrated in FIG. 3g, and are described in further detail below.

Figure 3G:
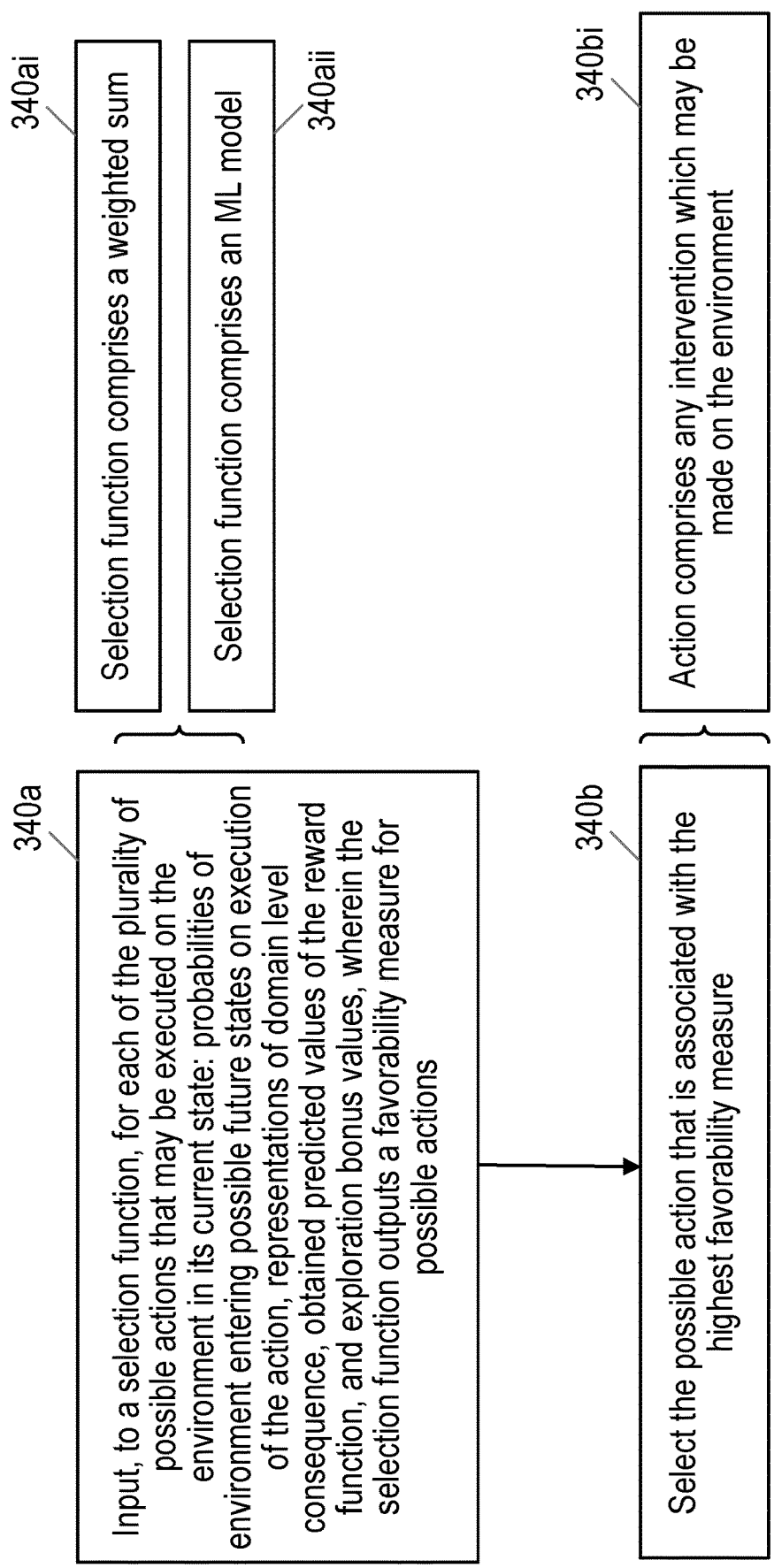

Referring now to FIG. 3g, selecting, from among the possible actions and on the basis of the obtained predicted values of the reward function and risk contours, an action for execution on the environment may comprise using a selection function. As illustrated at 340a, the distributed node may input to a selection function, for each of the plurality of possible actions that may be executed on the environment in its current state:
- the probabilities of the environment entering possible future states on execution of the action,
- the representations of a domain level consequence of the environment entering the possible future states,
- the obtained predicted values of the reward function representing possible impacts of execution of the possible action on performance of the task by the environment, and
- parameter values based on the confidence values associated with the probabilities, which parameter values may be the exploration bonus values calculated at step 335.

As illustrated at 340a, the selection function may process the provided inputs and output a favorability measure for each of the plurality of possible actions that may be executed on the environment in its current state. The selection function may for example comprise a weighted sum as illustrated at 340ai, or may comprise an ML model, as illustrated at 340aii. For example, the selection function may comprise a Neural Network having a plurality of trainable parameters (weights), which parameters may be trained such that the Neural Network outputs a favorability measure for possible actions that balances probability of entering a state, exploration bonus, domain level consequence of entering a state, and predicted reward in a manner that is consistent with operating priorities for the environment.

As illustrated at 340b, the distributed node may then select the possible action that is associated with the highest favorability measure. As illustrated at 340bi, an action may comprise any intervention that can be made on the environment and/or on logical or physical components comprised within the environment. Examples of possible actions are discussed in greater detail below with reference to example use cases for the present disclosure.

Referring again to FIG. 3b, following selection of an action, the distributed node initiates execution of the selected action on the environment in step 350. The distributed node then obtains a representation of an updated state of the environment following execution of the selected action in step 355 and, in step 360, obtains, on the basis of the representation, a value of the reward function representing an impact of execution of the selected action on performance of the task by the environment. This may for example comprise inputting the representation of the updated state to a reward function.

Referring now to FIG. 3c, in step 365, the distributed node transmits to a server node the representation of the state of the environment before execution of the selected action, the selected action, and the obtained value of the reward function representing an impact of execution of the selected action on performance of the task by the environment. The distributed node may also transmit the representation of the updated state of the environment, although this will become the current state and so will be transmitted following execution of the next action. In step 370, the distributed node updates the RL process used to obtain predicted values of a reward function on the basis of the obtained value of the reward function. This may assist with generating more accurate predicted values in future, and may comprise using a difference between the obtained predicted values of the reward function as a loss function for updating the RL process.

In step 375, the distributed node obtains a measure of success of the selecting of actions for execution on the environment, and, in step 380, the distributed node updating a process for selecting, from among the possible actions and on the basis of the obtained predicted values of the reward function and risk contours, an action for execution on the environment, on the basis of the obtained measure of success. In some examples, updating the selection process at step 380 may comprise updating the selection function, for example updating weights of the weighted sum, on the basis of a measure of success of the selection function over an evaluation episode. The success measure may be distinguished from reward in that reward represents the impact upon task performance of a single selection action, whereas the success measure indicates how successful the selection of actions has been in increasing reward, and so improving task performance, over a period of time.

Figure 4A:
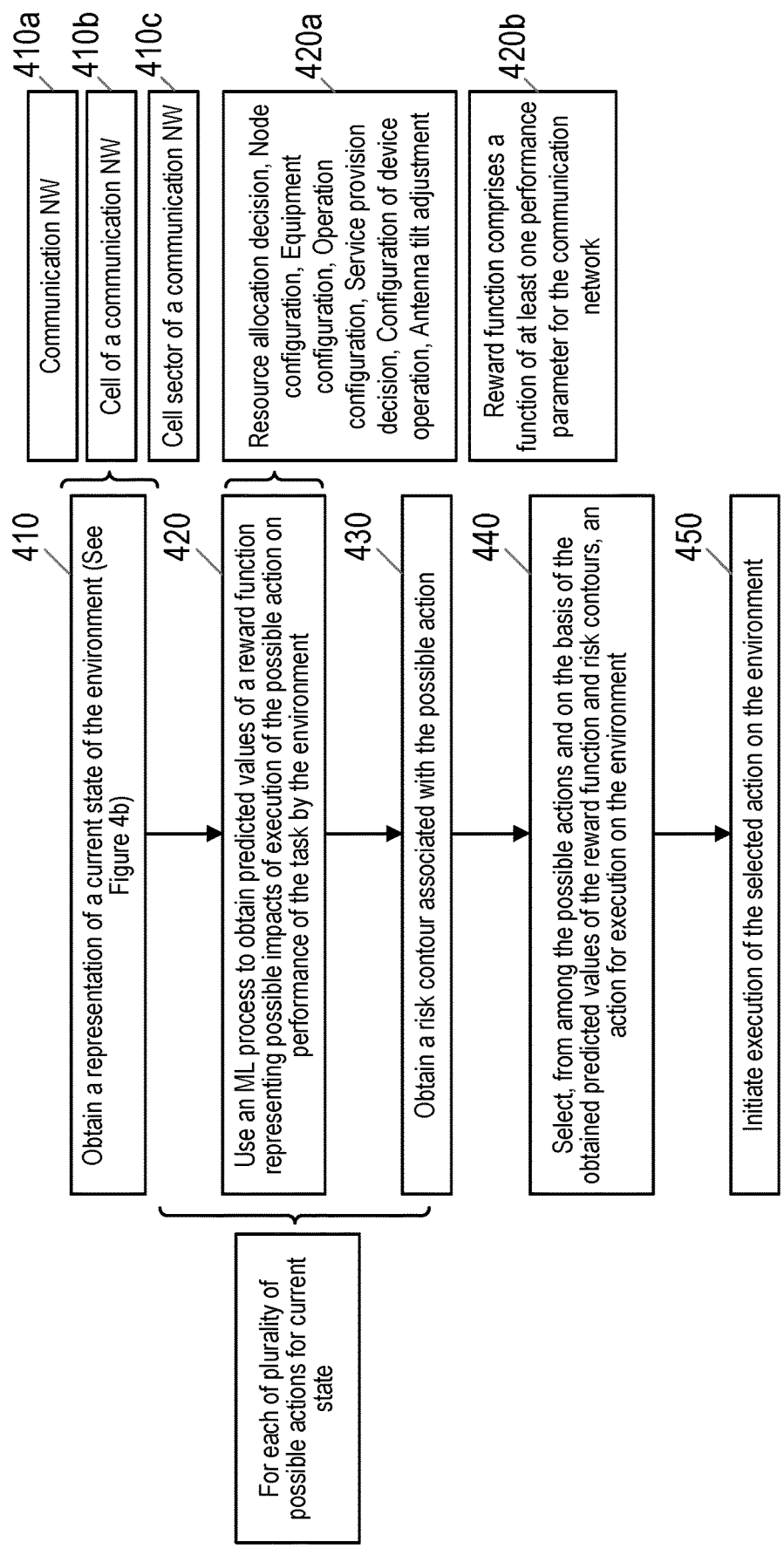
FIGS. 4a and 4b illustrate application of the method of FIG. 3 to communication network use cases.
Figure 4B:
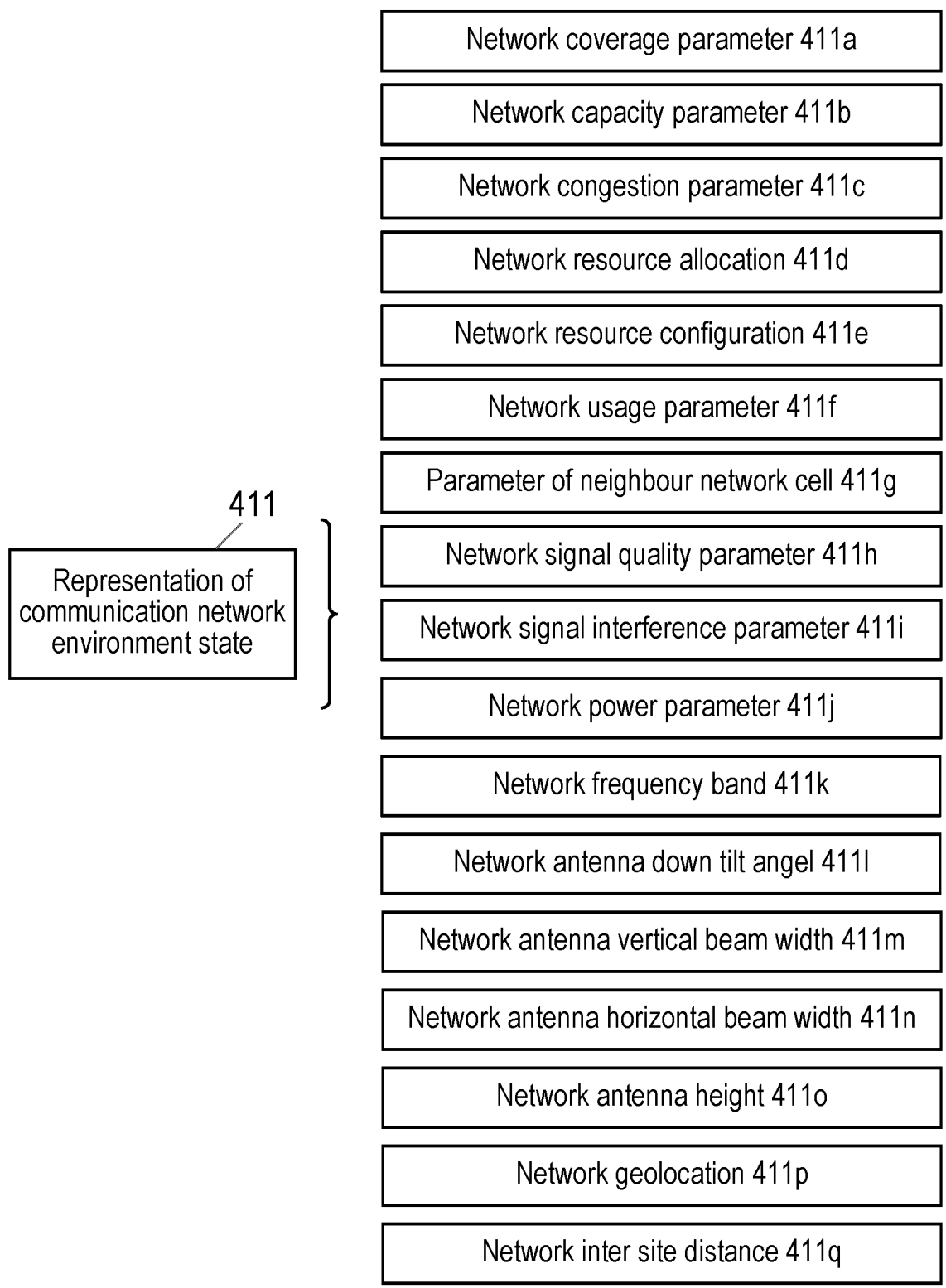

It will be appreciated that a range of different use cases may be envisaged for the methods 200, 300, according to which the environment, environment state representation, possible actions, etc. may take different forms. FIGS. 4a and 4b illustrate example implementation of the method 200 according to a variety of communication network use cases.

FIG. 4a is a flow chart illustrating process steps in another example of computer implemented method 400 for managing an environment within a domain, the environment being operable to perform a task. The method, performed by a distributed node, comprises obtaining a representation of a current state of the environment in a first step 410. As illustrated in FIG. 4a, the environment may in one example comprise a communication network 410a, and the task that the environment is operable to perform may comprise provision of communication network services. In other examples, the environment may comprise a cell 410b or cell sector 410c of a communication network, and the task that the environment is operable to perform may again comprise provision of communication network services, which may include radio access network services.

The representation of a current environment state that is generated according to the methods 200, 300, 400 may comprise parameter values for suitable parameters according to the particular environment. The parameters may for example be KPIs appropriate to the environment. FIG. 4b illustrates example elements that may be included in the representation 411 of the environment state for an environment comprising a region of a communication network, a cell of a communication network, a cell sector of a communication network, a group of cells of a communication network, etc. The example elements include:
- a value of a network coverage parameter 411a;
- a value of a network capacity parameter 411b;
- a value of a network quality parameter;
- a value of a network congestion parameter 411c;
- a current network resource allocation 411d;
- a current network resource configuration 411e;
- a current network usage parameter 411f;

a current network parameter of a neighbour communication network cell 411*g*;
a value of a network signal quality parameter 411*h*;
a value of a network signal interference parameter 411*i*;
a value of a network power parameter 411*j*;
a current network frequency band 411*k*;
a current network antenna down-tilt angle 411*l*;
a current network antenna vertical beamwidth 411*m*;
a current network antenna horizontal beamwidth 411*n*;
a current network antenna height 411*o*;
a current network geolocation 411*p*; and/or
a current network inter-site distance 411*q*.

In the case of an environment within a communication network, the KPIs may be specific to the network or to the environment, for example KPI values for a specific cell, cell sector, etc. Such parameters may include Signal to Interference plus Noise ratio (SINR), a Timing Advance overshooting indicator such as taOvershooting, and/or an interference parameter for the cell such as numTimesInterf.

Referring again to FIG. 4*a*, the distributed node performs steps 420 and 430 for each of a plurality of possible actions that may be executed on the environment in its current state. In step 420, the distributed node uses an RL process to obtain predicted values of a reward function representing possible impacts of execution of a possible action on performance of the task by the environment. As illustrated at 420*a*, in an environment that is a part of a communication network, possible actions may include an allocation decision for a communication network resource;
a configuration action for a communication network node;
a configuration action for communication network equipment;
a configuration action for a communication network operation;
a decision relating to provision of communication network services for a wireless device;
a configuration action for an operation performed by a wireless device in relation to the communication network;
a down tilt adjustment value for an antenna serving a cell or cell sector.

As illustrated at 420*b*, the reward function may comprise a function of one or more performance parameters for the communication network.

At step 430, the distributed node obtains a risk contour associated with each of the plurality of possible actions for the current state of the environment. At step 440, the distributed node selects, from among the possible actions and on the basis of the obtained predicted values of the reward function and risk contours, an action for execution on the environment. Finally, at step 450, the distributed node initiates execution of the selected action on the environment.

The methods 200, 300 and 400 may be complemented by methods 500, 600, 700 performed by a server node.

Figure 5:
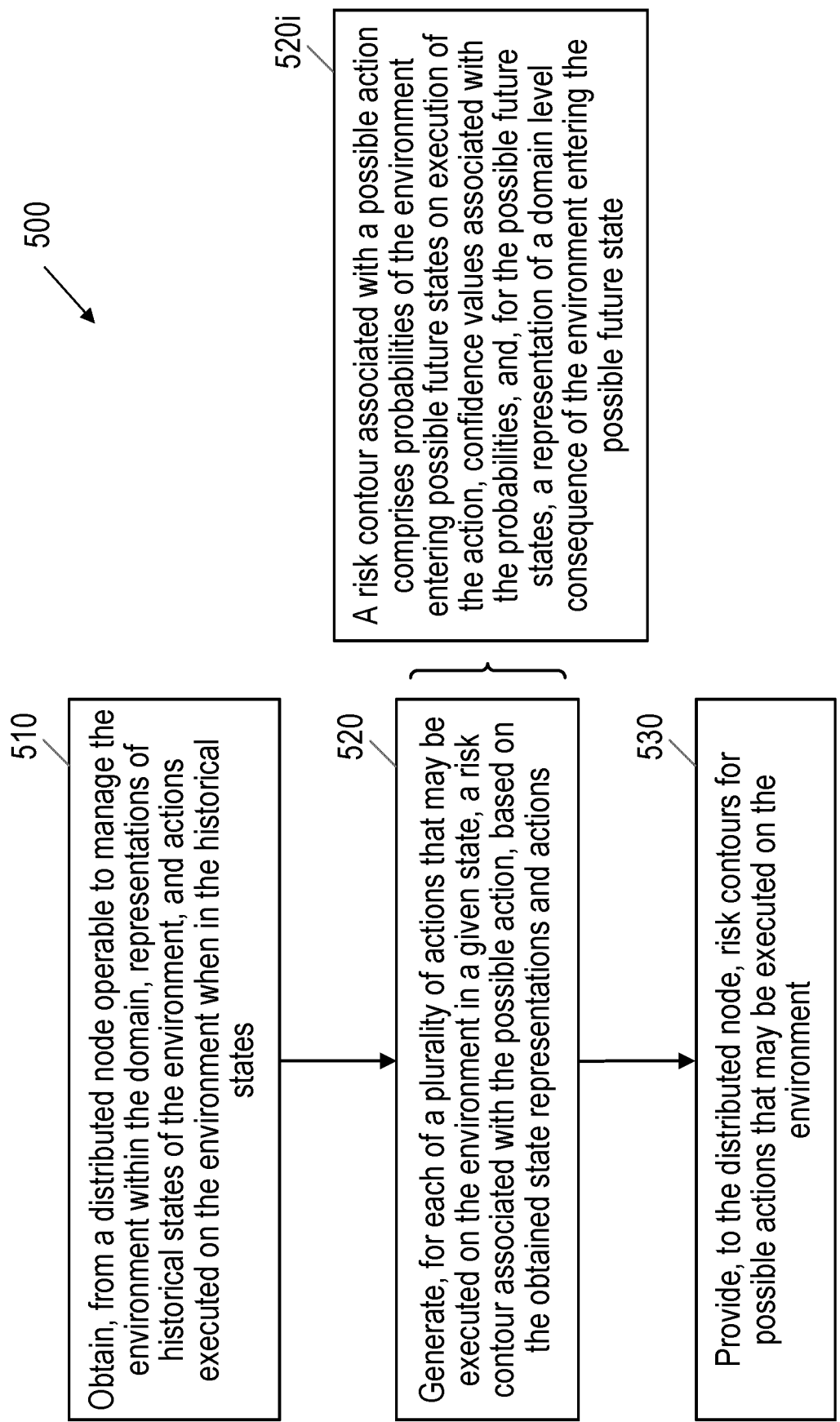
FIG. 5 is a flow chart illustrating process steps in a computer implemented method for facilitating management of an environment within a domain.

FIG. 5 is a flow chart illustrating process steps in a computer implemented method 500 for facilitating management of an environment within a domain, the environment being operable to perform a task. The method 500 is performed by a server node which may comprise a physical or virtual node, and may be implemented in a server apparatus and/or in a virtualized environment, for example in a cloud or fog deployment. In the case of an environment comprising a part of a communication network, the server node may comprise or be instantiated in any part of a logical core network node, network management centre, network operations centre, Radio Access Network node etc. Any such communication network node may itself be divided between several logical and/or physical functions, and any one or more parts of the server node may be instantiated in one or more logical or physical functions of a communication network node. A Radio Access Network Node may comprise a base station, eNodeB, gNodeB, or any other current or future implementation of functionality facilitating the exchange of radio network signals between nodes and/or users of a communication network.

Referring to FIG. 5, the method 500 comprises, in a first step 510, obtaining, from a distributed node operable to manage the environment within the domain, representations of historical states of the environment, and actions executed on the environment when in the historical states. In step 520, the method comprises generating, for each of a plurality of actions that may be executed on the environment in a given state, a risk contour associated with the possible action, based on the obtained state representations and actions. As illustrated at 520*i*, a risk contour associated with a possible action comprises probabilities of the environment entering possible future states on execution of the action, confidence values associated with the probabilities, and, for the possible future states, a representation of a domain level consequence of the environment entering the possible future state. In step 530, the method 500 comprises providing, to the distributed node, risk contours for possible actions that may be executed on the environment. According to different examples of the present disclosure, the "given state" in relation to which risk contours are generated at step 520 may be a current state of the environment and/or a possible future state. As discussed in further detail below, a server node carrying out the method 500 may also obtain reward function values from the distributed node and may use these in generating the risk contours. The server node may for example use an ML process to generate one or more elements of the risk contours, for example using an ML process to map from state/action/reward values to probabilities of entering a future possible state.

FIGS. 6*a* to 6*d* show flow charts illustrating another example of a computer implemented method 600 for facilitating management of an environment within a domain, the environment being operable to perform a task. As for the method 500 discussed above, the method 600 is performed by a server node, which may comprise a physical or virtual node, and may be implemented in an apparatus and/or in a virtualized environment, for example in a cloud or fog deployment. The method 600 illustrates examples of how the steps of the method 500 may be implemented and supplemented to provide the above discussed and additional functionality.

Referring initially to FIG. 6*a*, according to the method 600, in a first step 610, the server node obtains, from a plurality of distributed nodes operable to manage environments within the domain, representations of historical states of the environments, and actions executed on the environments when in the historical states. In step 620, the server node generates, for each of a plurality of actions that may be executed on an environment in a given state, a risk contour associated with the possible action, based on the obtained state representations and actions. Steps that may be involved in generating risk contours at step 620 are illustrated in FIG. 6*c*, and are described in further detail below.

Figure 6B:
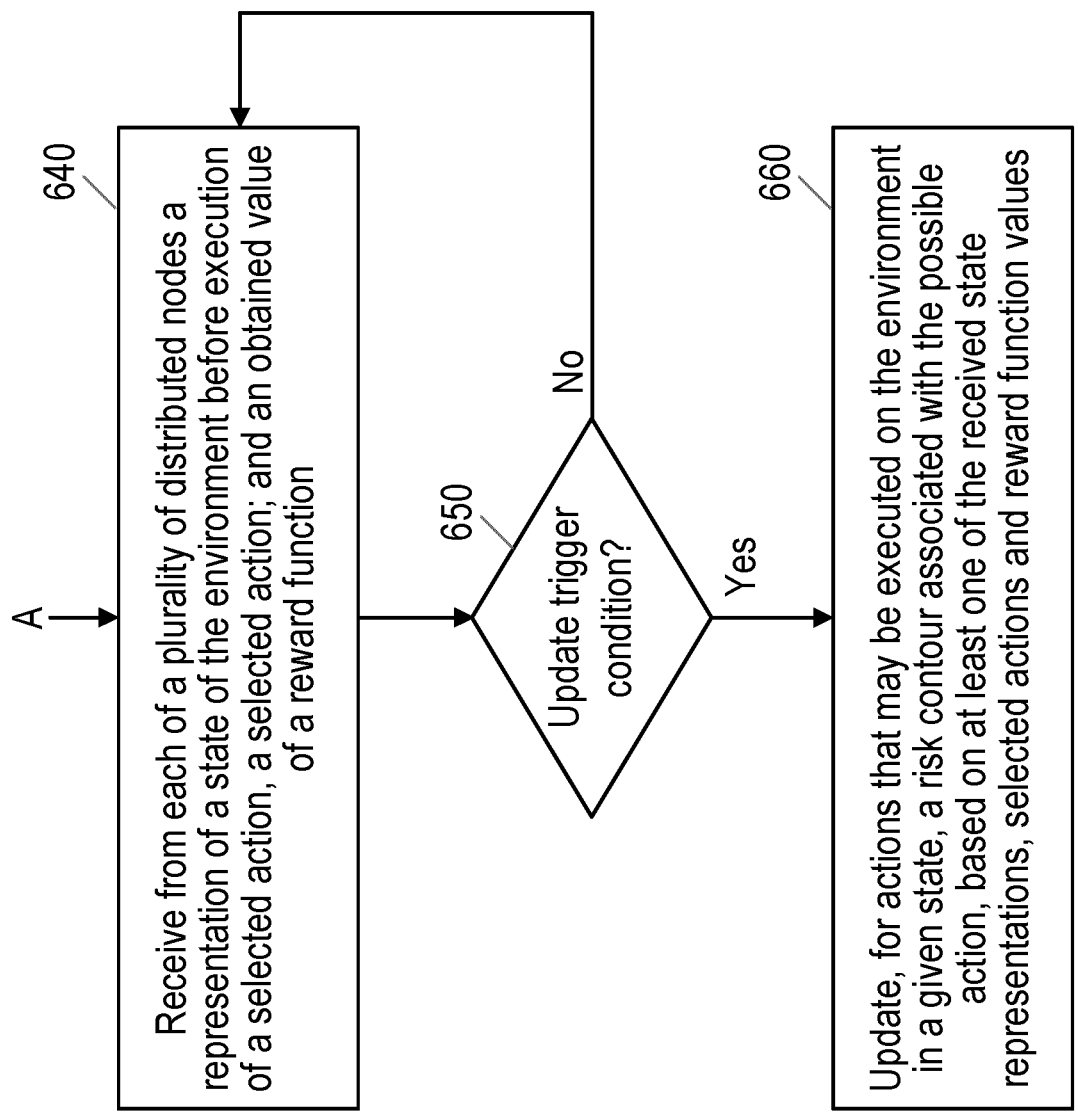
Figure 6C:
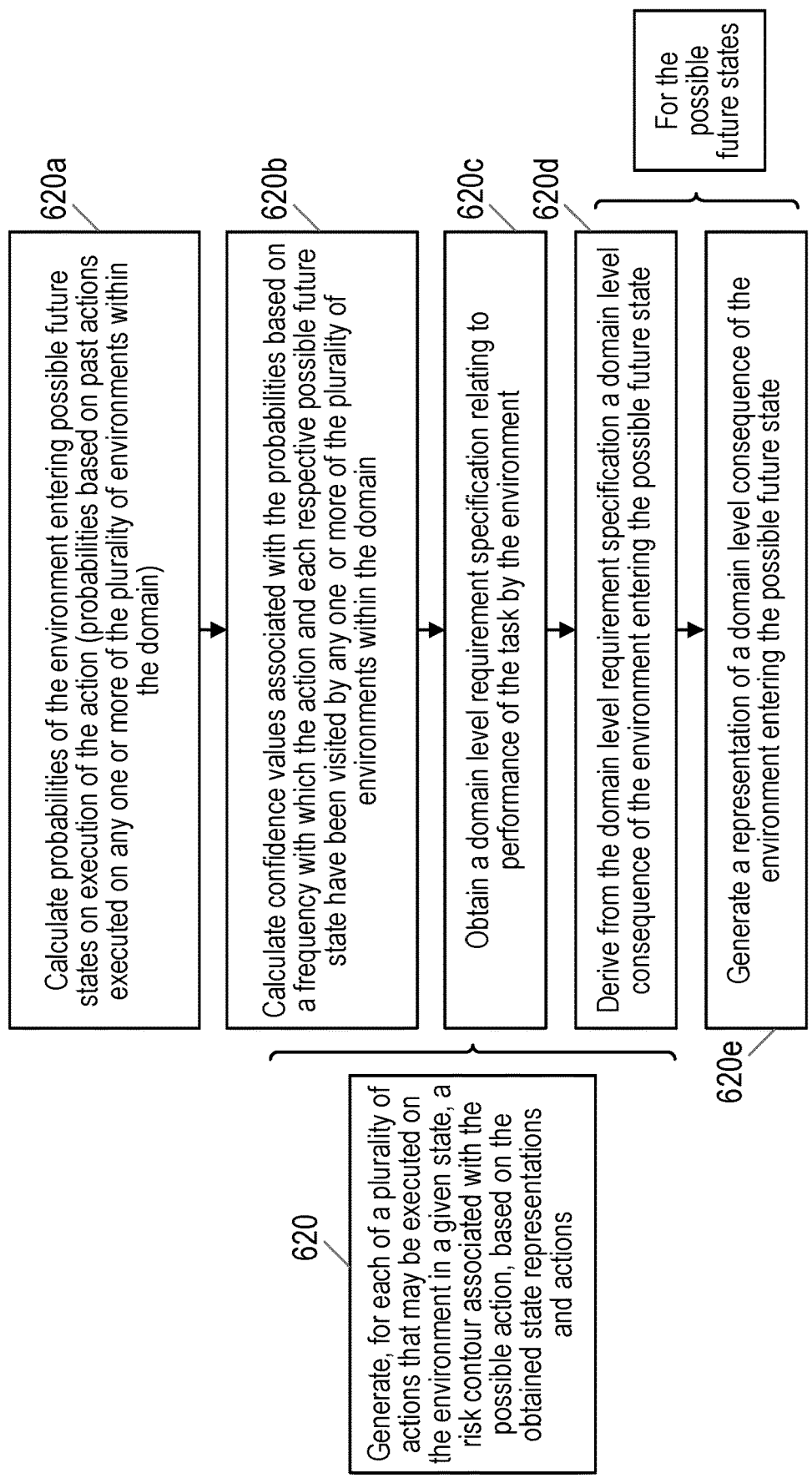

Referring now to FIG. 6*c*, generating a risk contour for an action that may be executed on an environment in a given state at step 620 may initially comprise, at step 620*a*, the server node calculating probabilities of the environment entering possible future states on execution of the action. As illustrated at 620*a*, the probabilities may be calculated based on past actions executed on any one or more of the plurality of environments within the domain. In step 620*b*, the server node calculates confidence values associated with the probabilities of the environment entering possible future states on execution of the action, the confidence values based on a frequency with which the action and each respective possible future state have been visited by any one or more of the plurality of environments within the domain. Thus, the confidence values associated with probabilities for actions and states that have been visited many times by one or more environments within the domain will be high. Conversely, probabilities for actions and states that have rarely been visited will be associated with relatively low confidence values. As discussed above with reference to the method 300, these low confidence values will translate to high exploration bonus values to incentivize exploration of the state action space.

In step 620*c*, the server node obtains a domain level requirement specification relating to performance of the task by the environment. The domain level requirement specification may include any domain level information that enables quantifying of a domain level consequence of entering a state. The domain level requirement specification may for example comprise an SLA or other contractual document, performance requirements, etc. The server node then performs steps 620*d* and 620*e* for the possible future states that the environment may enter on execution of the action. In step 620*c*, the server node derives from the domain level requirement specification a domain level consequence of the environment entering the possible future state. In step 620*e*, the server node generates a representation of the domain level consequence of the environment entering the possible future state. The representation may quantify the consequence, for example placing a positive or negative value, or hazard score, on the consequence. The nature of the domain level consequence will be dependent on the nature of the environment and the task that it performs, and may for example be related to thresholds for KPIs related to performance of the task by the environment. For example, in the case of a communication network, if falling below a threshold of 95% accessibility is associated in an SLA with a financial or other penalty, then states having accessibility below 95% may be associated with domain level consequence that is breaching the SLA, and the representation of that consequence may be a relatively high numerical value. The numerical range for the representation of the domain level consequence may be determined by the ranges for the values of probabilities, confidence values and predicted reward generated by distributed nodes. The numerical range and chosen values for representations of domain level consequences may be set to ensure that the tradeoff between exploration and safety that is implemented at the distributed node via the methods 200, 300, 400 is in accordance with the relative importance for an operator or administrator of the domain of performance optimization through exploration and respect for safety constraints expressed through domain level consequence representations.

Referring again to FIG. 6*a*, having generated the risk contours comprising probabilities, confidence scores and representations of domain level consequences, the server node provides to a distributed node in step 630, risk contours for possible actions that may be executed on the environment managed by the distributed node. Steps that may be involved in providing risk contours at step 630 are illustrated in FIG. 6*d*, and are described in further detail below.

Figure 6D:
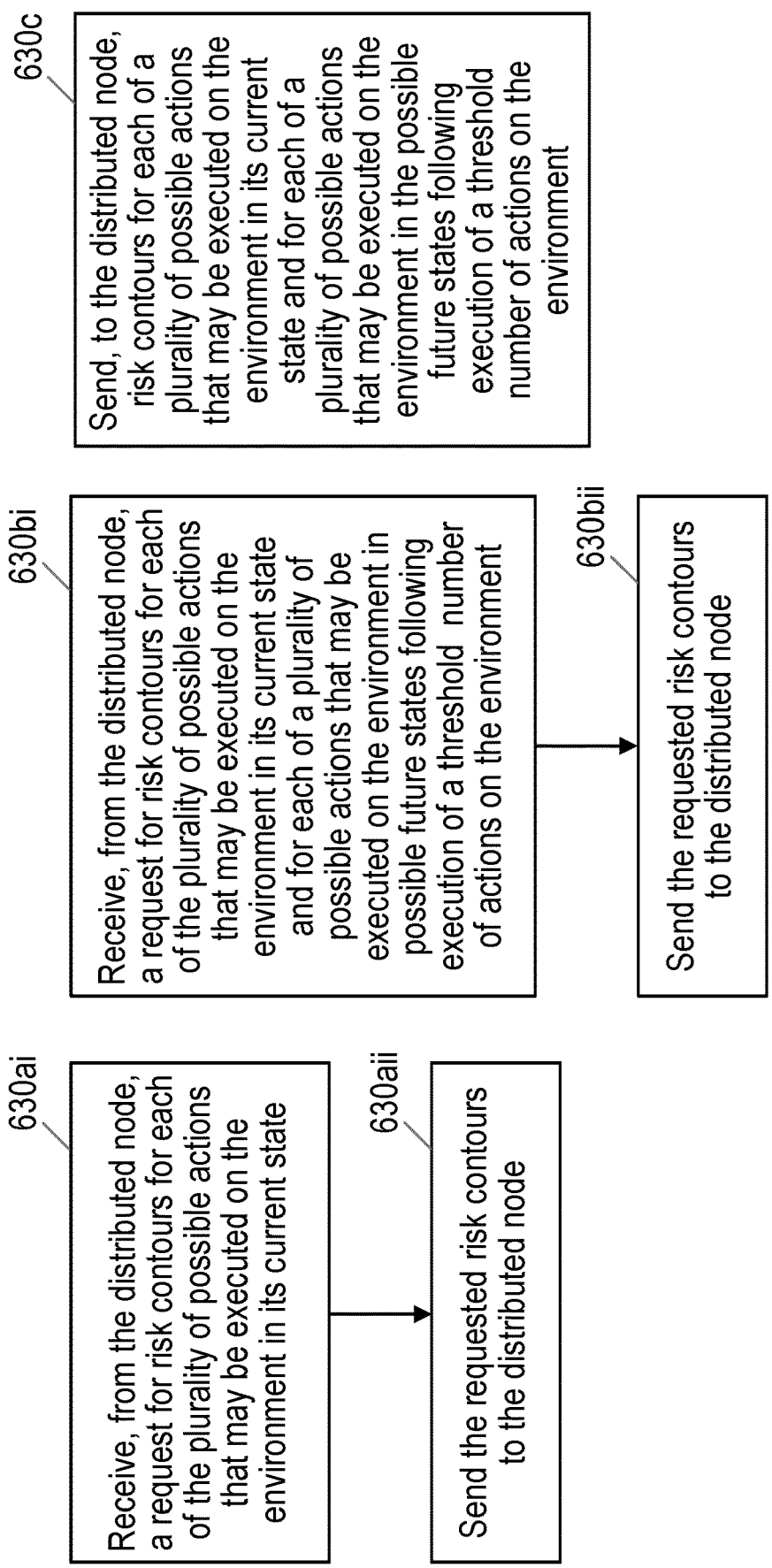

FIG. 6*d* illustrates three different options for the provision of risk contours to a distributed node. In a first option, at step 630*ai*, the server node receives from the distributed node a request for risk contours for each of the plurality of possible actions that may be executed on the environment in its current state. In step 630*aii*, the server node sends the requested risk contours to the distributed node. The server node may in some examples use a state action model to determine what actions are possible in the current state of the relevant environment. As discussed above, the request at step 630*ai* may in some examples be implicit, for example in the sending by the distributed node of state representation, selected action, and reward value, as discussed below.

In another option, at step 630*bi*, the server node receives from the distributed node a request for risk contours for each of the plurality of possible actions that may be executed on the environment in its current state, and for each of a plurality of possible actions that may be executed on the environment in possible future states following execution of a threshold number of actions on the environment. In step 630*bii*, the server node sends the requested risk contours to the distributed node. In some examples the threshold number may encompass the entire state action space.

In another option, at step 630*c*, the server node sends to the distributed node risk contours for each of a plurality of possible actions that may be executed on the environment in its current state and for each of a plurality of possible actions that may be executed on the environment in possible future states following execution of a threshold number of actions on the environment. As illustrated at 630*c*, the server node may provide the risk contours without first receiving a request for the risk contours from the distributed node.

Referring now to FIG. 6*b*, following provision of the risk contours in step 630, the server node receives from each of a plurality of distributed nodes in step 640 a representation of a state of the environment before execution of a selected action, a selected action, and an obtained value of a reward function representing an impact of execution of the selected action on performance of the task by the environment. The reward function may in some examples be specific to a particular environment, so that the same state in different environments may result in different reward function values. The server node may also receive from each distributed node a representation of an updated state of the environment following execution of the selected action, although this will become the current state and so will be transmitted by the distributed node following execution of the next action.

In step 650, the server node may check for fulfilment of an update trigger condition. The update trigger condition may for example be time-based or situation-based. For example, the update trigger may implement periodic updates of risk contours, updates based on a success measure for the selection of actions at a distributed node, etc. If the update trigger condition is fulfilled, the server node updates, for actions that may be executed on the environment in a given state, a risk contour associated with the possible action, based on at least one of the received state representations, selected actions and reward function values. Updating risk contours may comprise performing the steps of FIG. 6*c* on the basis of the information received at step 640.

It will be appreciated that much of the detail described above with reference to the methods 200, 300 and 400 also applies to the method 600. For example, the nature of the environment, the elements that may be included in the state representation, the possible actions etc. may all be substantially as described above with reference to FIGS. 2 to 4*b*.

As noted above, a range of possible use cases can be envisaged for the methods 500, 600, and examples of such use cases are discussed more fully below. Reference is made to FIGS. 4a and 4b and the accompanying description for a discussion of examples of environment, state representation, and actions which may also be applicable to the methods 500, 600.

Figure 7:
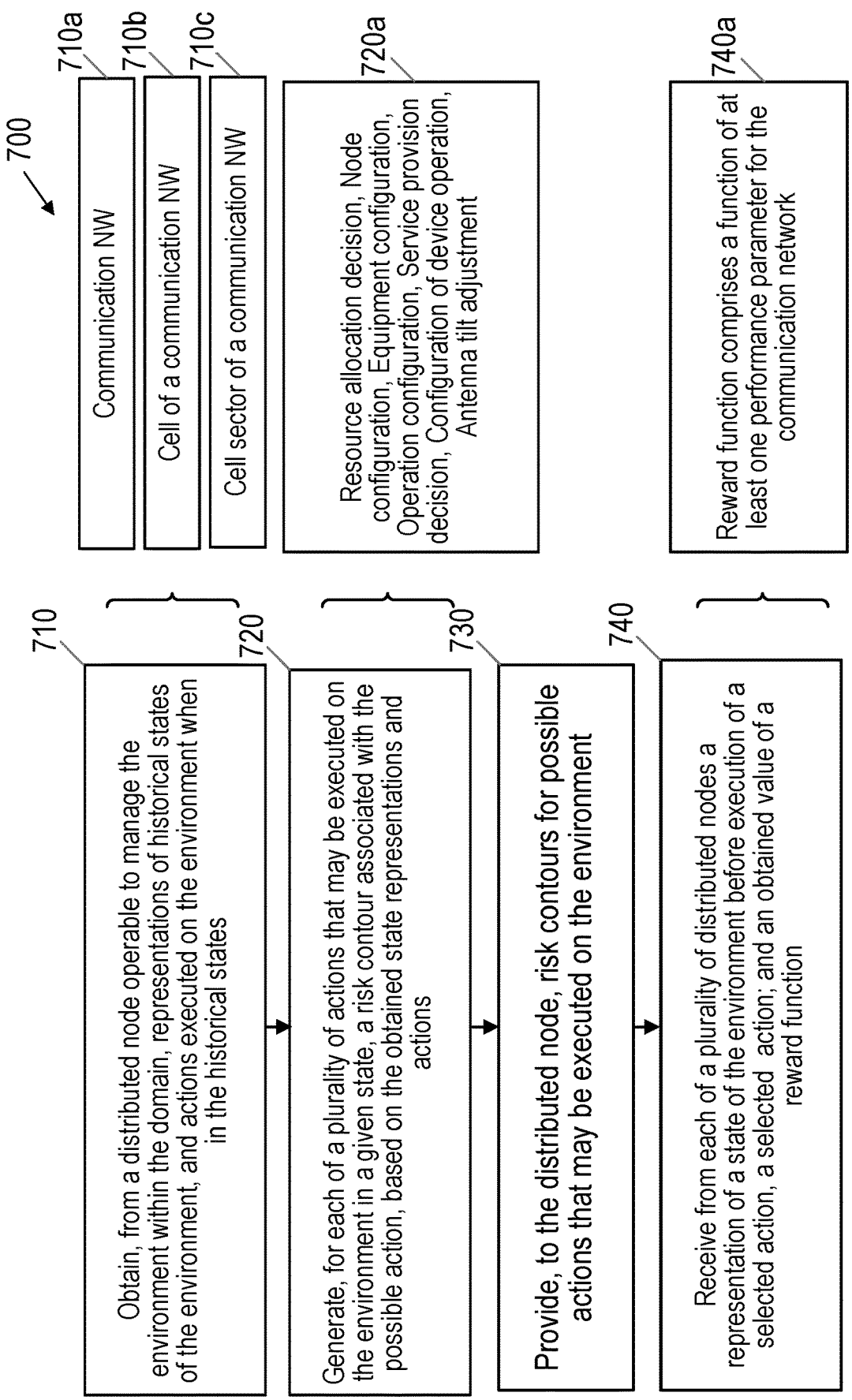
FIG. 7 illustrates application of the method of FIG. 5 to communication network use cases.

FIG. 7 illustrates an example application of the methods 500, 600 to communication network related use cases. FIG. 7 is a flow chart illustrating process steps in another example of a computer implemented method 700 for facilitating management of an environment within a domain, the environment being operable to perform a task. The method, performed by a server node, comprising: The method, performed by a distributed node, comprises obtaining, from a distributed node operable to manage the environment within the domain, representations of historical states of the environment, and actions executed on the environment when in the historical states. As illustrated in FIG. 7, the environment may in one example comprise a communication network 710a, and the task that the environment is operable to perform may comprise provision of communication network services. In other examples, the environment may comprise a cell 710b or cell sector 710c of a communication network, and the task that the environment is operable to perform may again comprise provision of communication network services, which may include radio access network services.

The representation of a current environment state that is generated according to the methods received according to the methods 500, 600, 700 may comprise parameter values for suitable parameters according to the particular environment. The parameters may for example be KPIs appropriate to the environment. FIG. 4b discussed above illustrates example elements that may be included in the representation of the environment state for an environment comprising a region of a communication network, a cell of a communication network, a cell sector of a communication network, a group of cells of a communication network, etc.

In the case of an environment within a communication network, the KPIs may be specific to the network or to the environment, for example KPI values for a specific cell, cell sector, etc. Such parameters may include Signal to Interference plus Noise ratio (SINR), a Timing Advance overshooting indicator such as taOvershooting, and/or an interference parameter for the cell such as numTimesInterf.

In step 720, the server node generates, for each of a plurality of actions that may be executed on the environment in a given state, a risk contour associated with the possible action, based on the obtained state representations and actions. As illustrated at 720a, in an environment that is a part of a communication network, possible actions may include:
  an allocation decision for a communication network resource;
  a configuration action for a communication network node;
  a configuration action for communication network equipment;
  a configuration action for a communication network operation;
  a decision relating to provision of communication network services for a wireless device;
  a configuration action for an operation performed by a wireless device in relation to the communication network;
a down tilt adjustment value for an antenna serving a cell or cell sector.

In step 730, the server node provides, to the distributed node, risk contours for possible actions that may be executed on the environment. In step 740, the server node receives from the distributed node a representation of a state of the environment before execution of a selected action, a selected action, and an obtained value of a reward function representing an impact of execution of the selected action on performance of the task by the environment. As illustrated at 740a, the reward function may comprise a function of at least one performance parameter for the communication network.

There now follows a discussion of additional detail relating to the methods described above in the context of a communication network use case. The following discussion illustrates one example of how the methods of the present disclosure may be implemented to address an example technical scenario. Although the example use case is drawn from the telecoms domain, it will be appreciated that other use cases in other technical domains may be envisaged.

Figure 8:
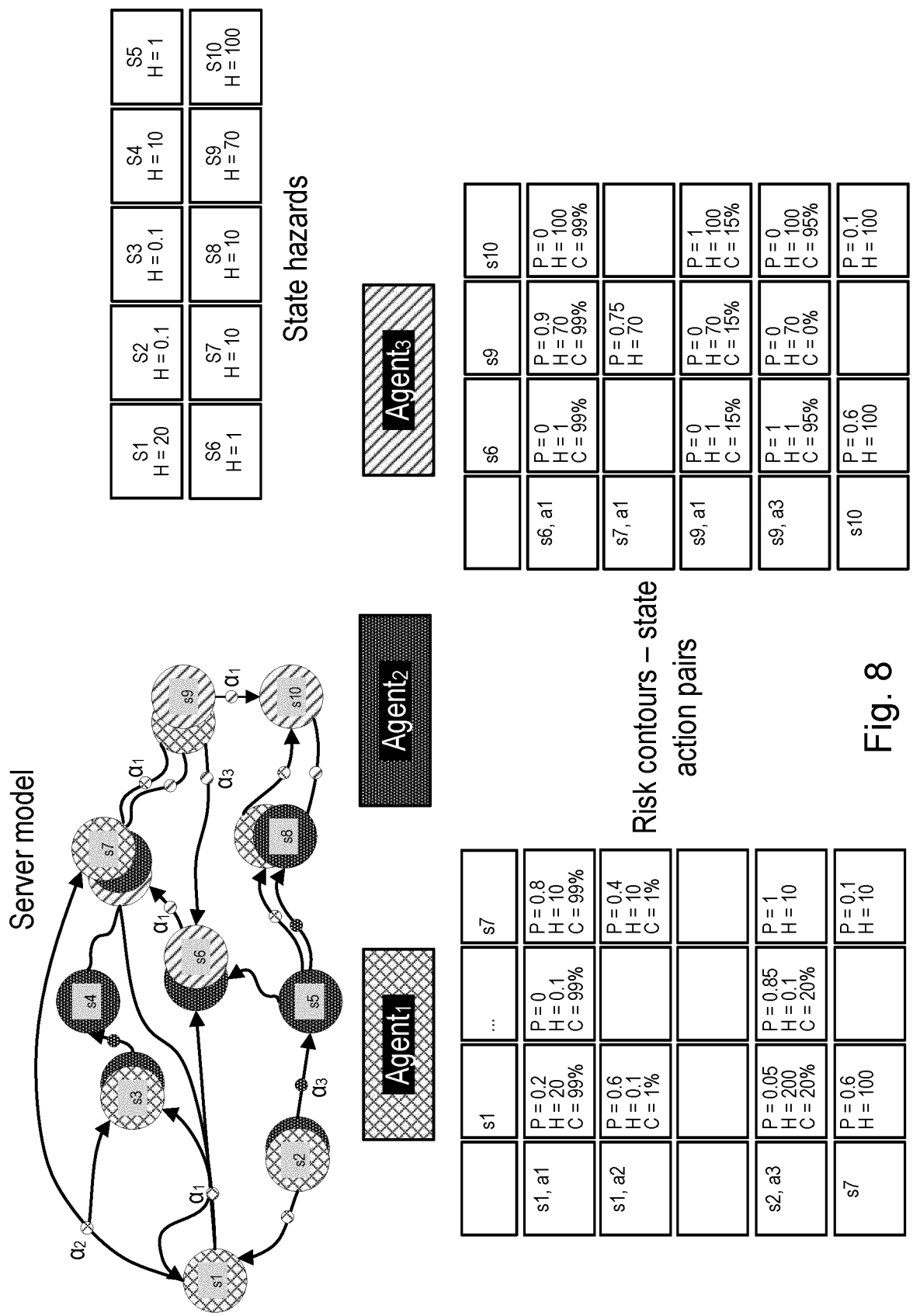
FIG. 8 illustrates an example server model and risk contours.

FIG. 8 illustrates an example server model, and risk contours, and shows how individual distributed nodes (illustrated as Agents in FIG. 8) may use the model and risk contours to manage environments. In FIG. 8, the states and actions visited by an agent in one episode are represented by a specific shading in the server version of the model. It will be appreciated that the same state can be visited by multiple agents. On the right of FIG. 8, a table shows hazard scored for different states. As discussed above, the hazard score is a representation of a domain level consequence of entering a particular state. The hazard score may be generated on the basis of any specification of requirements that applies to the domain in which the environments are situated. Considering a telecoms example, in 5G network slicing, a safety specification may be defined in terms of a high-level intent, such as "end to end slice latency should never be higher than 1 second". The hazard score for individual states can for example be computed on the basis of latencies in individual sub-domains that are part of the slice. For example if Data center1 has a latency of 800 ms, the consequence for respecting the 1 second limit of the slice visiting a state associated with Data center1 is much higher than that of visiting a state associated with Data center2, which has a of 100 ms. The hazard scores for states associated with the two data centers may be set to reflect the consequences of visiting those states for respecting the 1 second end to end latency limit.

As discussed above, each distributed node, or agent, makes use of the risk contours to independently manage the trade-off between exploration and safety when selecting actions for executing in its environment. This trade-off is illustrated in the following examples with reference to the model and agents of FIG. 8.

Example 1

Agent_1 starts at state s1 and has the possibility of taking action a1 or action a2. Risk contours for actions a1 and a2 have been obtained, and illustrated in FIG. 8.
Action a1:
  If a1 is selected, there is a probability of 0.2 of remaining in state s1, and a probability of 0.8 of entering state s7. Entering state s7 is therefore considerably more likely as a consequence of taking action a1 than remaining in state s1. The confidence scores of the probabilities for action a1 are 99%, resulting in an exploration bonus of +0. State s7 is associated with a hazard score of 10, and state s1 is associated with a hazard score of 20. The predicted reward of entering state s7 (not illustrated) is 10, while the predicted reward of staying in s1 is 1.

Action a2:

If a2 is selected, there is a probability of 0.6 of remaining in state s1, and a probability of 0.4 of entering state s7. Remaining in state s1 is therefore more likely as a consequence of taking action a2 than entering state s7. The confidence scores of the probabilities for action a1 are 1%, resulting in an exploration bonus of +100. The hazard scores and predicted rewards of states s1 and s7 are as discussed above.

Agent 1 enters the probabilities, hazard scores, exploration bonuses and predicted rewards into a selection function, such as for example a weighted sum, and generates an action selection.

F(probability, hazard, reward, exploration bonus)→action selection

In the present example, the action selection representing the best trade-off between safety and performance optimization is likely to be action a2, owing to the high exploration bonus for this action, relatively low hazard scores of the two possible states and relatively small difference in reward.

Example 2

Agent_3 starts at state s9 and has the possibility of taking action a1 or action a3. Risk contours for actions a1 and a3 have been obtained, and illustrated in FIG. 8.
Action a1:

If a1 is selected, there is a probability of 1 of entering state s10. Entering state s10 is therefore effectively certain as a consequence of taking action a1. The confidence score of the probability for entering s10 following action a1 is 15%, resulting in an exploration bonus of +10. State s10 is associated with a hazard score of 100. The predicted reward of entering state s10 (not illustrated) is 0.
Action a3:

If a3 is selected, there is a probability of 1 of entering state s6. Entering state s6 is therefore effectively certain as a consequence of taking action a3. The confidence score of the probability for entering s6 following action a3 is 95%, resulting in an exploration bonus of +1. State s6 is associated with a hazard score of 1. The predicted reward of entering state s6 (not illustrated) is 10.

Agent 3 enters the probabilities, hazard scores, exploration bonuses and predicted rewards into a selection function, such as for example a weighted sum, and generates an action selection.

F(probability, hazard, reward, exploration bonus)→action selection

In the present example, the action selection representing the best trade-off between safety and performance optimization is likely to be action a3, owing to the high hazard score associated with state s10.

In some examples, the hazard score, or representation of domain level consequence, may be a differential value delta_hazard, representing the difference in hazard values between adjacent states according to some measure of adjacency.

Figure 9:
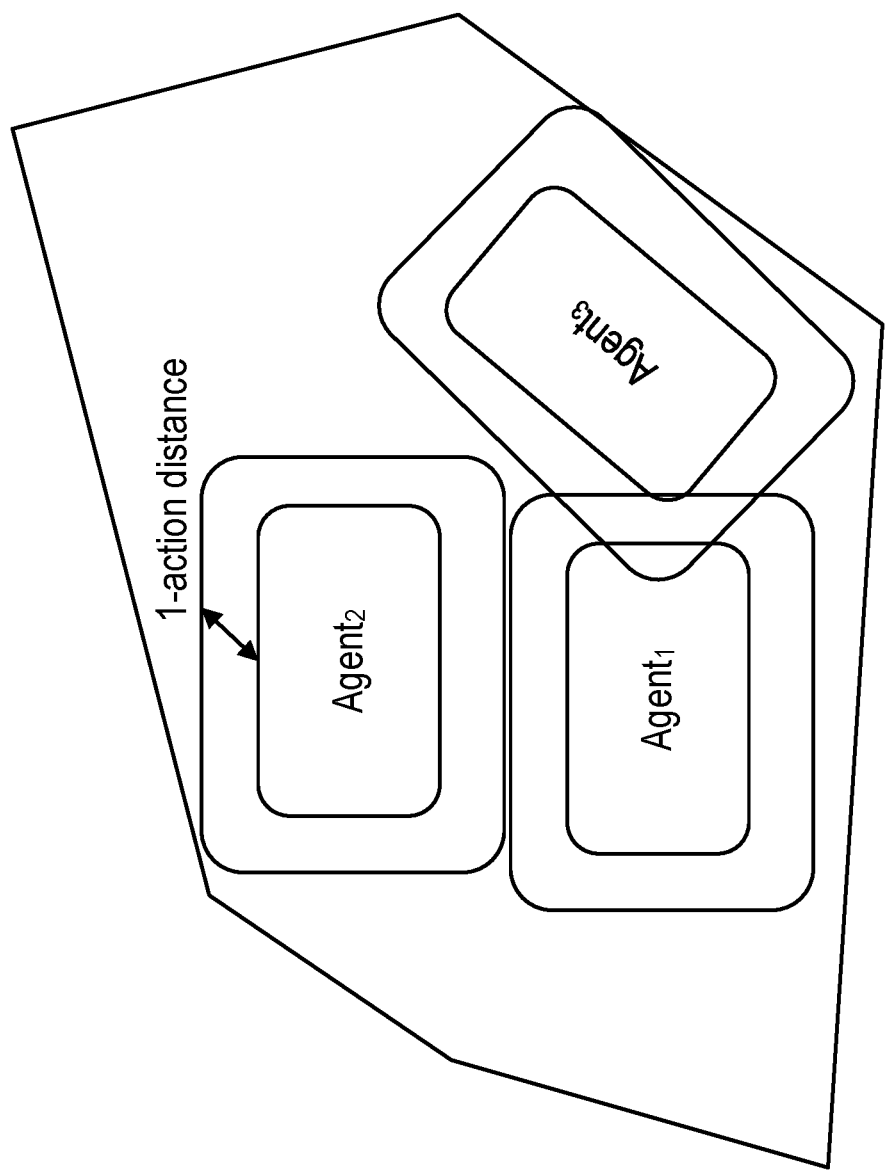
FIG. 9 illustrates action spaces around agents illustrated in FIG. 8.

As discussed above, having generated risk contours for possible actions that may be executed on an environment, a server node provides the risk contours to distributed nodes for use in managing one or more environments. Different options exist for the extent of risk contours provided to distributed nodes and the signaling procedure by which they are provided. For example, risk contours may be provided via an Application Programming Interface. For each state and action, a distributed node can request or simply receive the relevant risk contours. This option is storage efficient for the distributed nodes but requires relatively high bandwidth for regular provision of risk contours. In another example, a server node may calculate k-action distance from a distributed node's current state-action space and provide risk contours for the calculated distance, where k may for example be the length of an episode. k-action distance refers to all states that may be visited by a distributed node within k possible action sequences of the current state. FIG. 9 illustrates 1-action spaces around each of the three agents illustrated in FIG. 8. Provision of risk contours for k-action distance represents a relatively balanced approach between efficiency of bandwidth use and efficiency of storage for distributed nodes. In a further example, risk contours for the full state-action space may be provided to the distributed nodes. This allows for the distributed nodes to make more informed decisions, and to perform long term learning and planning. The different example options for provision of risk contours illustrate the balance that may be found between bandwidth, storage, and visibility for long term informed planning.

As discussed above, the methods 200, 300 and 400 are performed by a distributed node, and the present disclosure provides a distributed node that is adapted to perform any or all of the steps of the above discussed methods. The distributed node may be a physical or virtual node, and may for example comprise a virtualised function that is running in a cloud, edge cloud or fog deployment. The distributed node may for example comprise or be instantiated in any part of a logical core network node, network management centre, network operations centre, Radio Access node etc. Any such communication network node may itself be divided between several logical and/or physical functions, and any one or more parts of the management node may be instantiated in one or more logical or physical functions of a communication network node.

Figure 10:
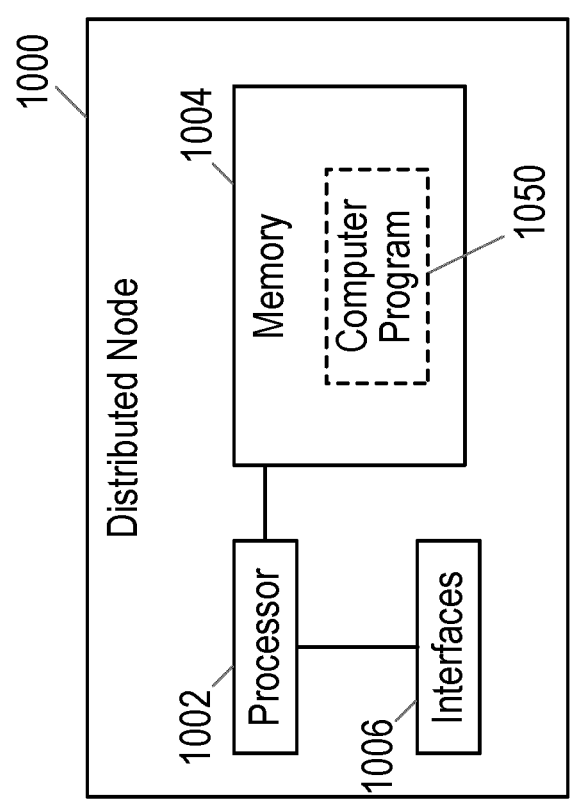

FIG. 10 is a block diagram illustrating an example distributed node 1000 which may implement the method 200, 300 and/or 400, as illustrated in FIGS. 2 to 4*b*, according to examples of the present disclosure, for example on receipt of suitable instructions from a computer program 1050. Referring to FIG. 10, the distributed node 1000 comprises a processor or processing circuitry 1002, and may comprise a memory 1004 and interfaces 1006. The processing circuitry 1002 is operable to perform some or all of the steps of the method 200, 300 and/or 400 as discussed above with reference to FIGS. 2 to 4*b*. The memory 1004 may contain instructions executable by the processing circuitry 1002 such that the distributed node 1000 is operable to perform some or all of the steps of the method 200, 300 and/or 400, as illustrated in FIGS. 2 to 4*b*. The instructions may also include instructions for executing one or more telecommunications and/or data communications protocols. The instructions may be stored in the form of the computer program 1050. In some examples, the processor or processing circuitry 1002 may include one or more microprocessors or microcontrollers, as well as other digital hardware, which may include digital signal processors (DSPs), special-purpose digital logic, etc. The processor or processing circuitry 1002 may be implemented by any type of integrated circuit, such as an Application Specific Integrated Circuit (ASIC), Field Programmable Gate Array (FPGA) etc. The memory 1004 may include one or several types of memory suitable for the processor, such as read-only memory (ROM), random-access memory, cache memory, flash memory devices, optical storage devices, solid state disk, hard disk drive etc.

Figure 11:
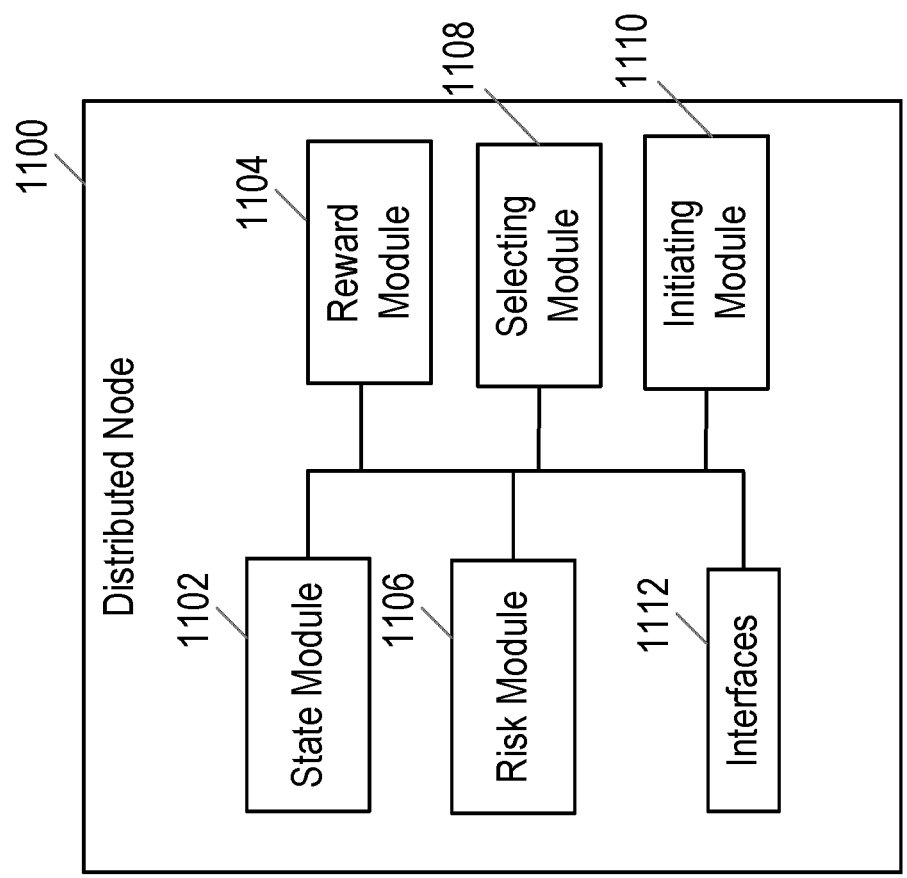
FIG. 11 illustrates functional modules in a distributed node.

FIG. 11 illustrates functional modules in another example of distributed node 1100 which may execute examples of the methods 200, 300 and/or 400 of the present disclosure, for example according to computer readable instructions received from a computer program. It will be understood that the modules illustrated in FIG. 11 are functional modules, and may be realised in any appropriate combination of hardware and/or software. The modules may comprise one or more processors and may be integrated to any degree.

Referring to FIG. 11, the distributed node 1100 is for managing an environment within a domain, the environment being operable to perform a task. The distributed node comprises a state module 1102 for obtaining a representation of a current state of the environment. The distributed node further comprises a reward module 1104 and risk module 1106 for: for each of a plurality of possible actions that may be executed on the environment in its current state, using an RL process to obtain predicted values of a reward function representing possible impacts of execution of the possible action on performance of the task by the environment, and obtaining a risk contour associated with the possible action. The distributed node further comprises a selecting module 1108 for selecting, from among the possible actions and on the basis of the obtained predicted values of the reward function and risk contours, an action for execution on the environment. The distributed node further comprises an initiating module 1110 for initiating execution of the selected action on the environment. The distributed node 1100 may further comprise interfaces 1112 which may be operable to facilitate communication with a server node, and/or with other nodes over suitable communication channels.

As discussed above, the methods 500, 600 and 700 are performed by a server node, and the present disclosure provides a server node that is adapted to perform any or all of the steps of the above discussed methods. The server node may be a physical or virtual node, and may for example comprise a virtualised function that is running in a cloud, edge cloud or fog deployment. The server node may for example comprise or be instantiated in any part of a logical core network node, network management centre, network operations centre, Radio Access node etc. Any such communication network node may itself be divided between several logical and/or physical functions, and any one or more parts of the management node may be instantiated in one or more logical or physical functions of a communication network node.

Figure 12:
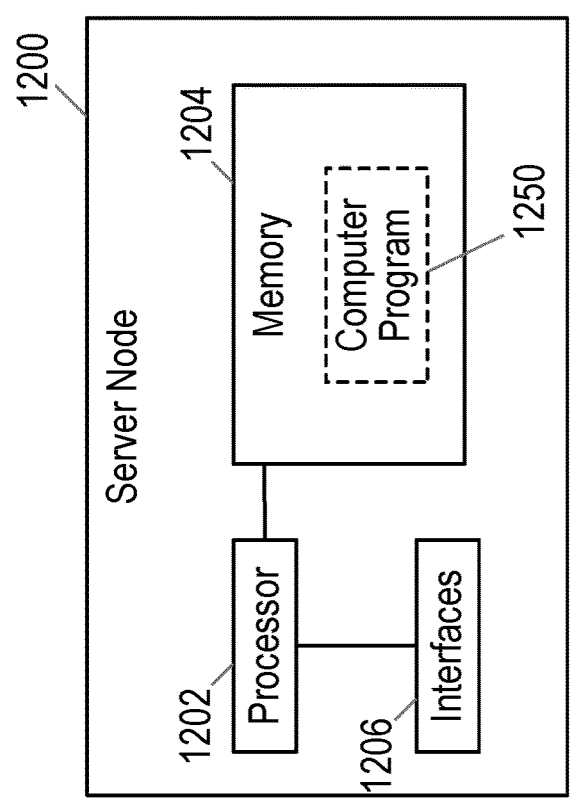
FIG. 12 illustrates functional modules in a server node.

FIG. 12 is a block diagram illustrating an example server node 1200 which may implement the method 500, 600 and/or 700, as illustrated in FIGS. 5 to 7, according to examples of the present disclosure, for example on receipt of suitable instructions from a computer program 1250. Referring to FIG. 12, the server node 1200 comprises a processor or processing circuitry 1202, and may comprise a memory 1204 and interfaces 1206. The processing circuitry 1202 is operable to perform some or all of the steps of the method 500, 600 and/or 700 as discussed above with reference to FIGS. 5 to 7. The memory 1204 may contain instructions executable by the processing circuitry 1202 such that the server node 1200 is operable to perform some or all of the steps of the method 500, 600 and/or 700, as illustrated in FIGS. 5 to 7. The instructions may also include instructions for executing one or more telecommunications and/or data communications protocols. The instructions may be stored in the form of the computer program 1250. In some examples, the processor or processing circuitry 1202 may include one or more microprocessors or microcontrollers, as well as other digital hardware, which may include digital signal processors (DSPs), special-purpose digital logic, etc.

The processor or processing circuitry 1202 may be implemented by any type of integrated circuit, such as an Application Specific Integrated Circuit (ASIC), Field Programmable Gate Array (FPGA) etc. The memory 1204 may include one or several types of memory suitable for the processor, such as read-only memory (ROM), random-access memory, cache memory, flash memory devices, optical storage devices, solid state disk, hard disk drive etc.

Figure 13:
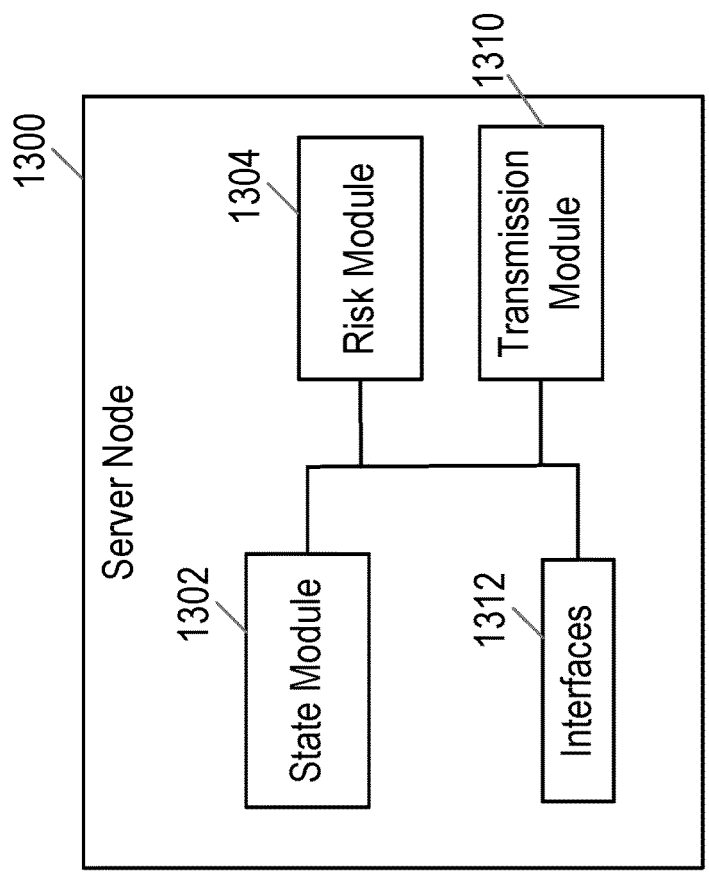
FIG. 13 illustrates functional modules in another example of server node.

FIG. 13 illustrates functional modules in another example of server node 1300 which may execute examples of the methods 500, 600 and/or 700 of the present disclosure, for example according to computer readable instructions received from a computer program. It will be understood that the modules illustrated in FIG. 13 are functional modules, and may be realised in any appropriate combination of hardware and/or software. The modules may comprise one or more processors and may be integrated to any degree.

Referring to FIG. 13, the server node 1300 is for facilitating management of an environment within a domain, the environment being operable to perform a task. The server node comprises a state module 1302 for obtaining, from a distributed node operable to manage the environment within the domain, representations of historical states of the environment, and actions executed on the environment when in the historical states. The server node further comprises a risk module 1304 for generating, for each of a plurality of actions that may be executed on the environment in a given state, a risk contour associated with the possible action, based on the obtained state representations and actions. The server node further comprises a transmission module 1310 for providing, to the distributed node, risk contours for possible actions that may be executed on the environment. The server node 1300 may further comprise interfaces 1312 which may be operable to facilitate communication with one or more distributed nodes, and/or with other nodes over suitable communication channels.

Examples of the present disclosure thus propose methods and nodes that facilitate safe RL in distributed systems. Probabilities of entering different states, together with confidence values for such probabilities and a representation of a domain level consequence of entering the states, are assembled int risk contours are provided to distributed nodes managing environments within the domain. The distributed nodes are able to select actions for execution on their managed environments in light of the provided risk contours and a predicted reward value associated with the different states, so balancing exploration of the state action space with performance optimisation and management of consequences of entering different states. Risk contours can be provided on demand, over a given action distance or for the entire state action space, offering different trade-offs between bandwidth, storage and visibility.

Examples of the present disclosure amble the safe exploitation of advantages offered by distributed learning systems. The provision of risk contours to distributed nodes enriches the information obviable to such nodes, and offering a balanced mechanism for the managing of exploration, performance optimisation and safety at individual distributed nodes.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended embodiments. The word "comprising" does not exclude the presence of elements or steps other than those listed in an embodiment, "a" or "an" does not exclude a plurality, and a single processor or other unit may fulfil the functions of several units recited in the embodiments. Any reference signs in the embodiments shall not be construed so as to limit their scope.

The invention claimed is:

1. A computer implemented method for managing an environment within a domain, the environment being operable to perform a task, the method, performed by a distributed node, comprising:
   obtaining a representation of a current state of the environment; and
   for each of a plurality of possible actions that may be executed on the environment in its current state:
      using a Reinforcement Learning, RL, process to obtain predicted values of a reward function representing possible impacts of execution of the possible action on performance of the task by the environment; and
      obtaining a risk contour associated with the possible action;
   the method further comprising:
   selecting, from among the possible actions and on the basis of the obtained predicted values of the reward function and risk contours, an action for execution on the environment; and
   initiating execution of the selected action on the environment;
   wherein a risk contour associated with a possible action comprises:
      probabilities of the environment entering possible future states on execution of the action;
      confidence values associated with the probabilities; and
      for the possible future states, a representation of a domain level consequence of the environment entering the possible future state.

2. A method as claimed in claim 1, wherein the environment is one of a plurality of environments within the domain, each environment managed by a respective distributed node.

3. A method as claimed in claim 2, wherein, in a risk contour associated with a possible action:
   the probabilities of the environment entering possible future states on execution of the action comprise probabilities that are based on past actions executed on any one or more of the plurality of environments within the domain.

4. A method as claimed in claim 2, wherein, in a risk contour associated with a possible action:
   confidence values associated with the probabilities of the environment entering possible future states on execution of the action comprise confidence values that are based on a frequency with which the action and each respective possible future state have been visited by any one or more of the plurality of environments within the domain.

5. A method as claimed in claim 4, further comprising:
   updating the RL process used to obtain predicted values of a reward function on the basis of the obtained value of the reward function.

6. A method as claimed in claim 1, further comprising:
   obtaining a representation of an updated state of the environment following execution of the selected action;
   obtaining, on the basis of the representation, a value of the reward function representing an impact of execution of the selected action on performance of the task by the environment; and
   transmitting, to a server node:
      the representation of the state of the environment before execution of the selected action;
      the selected action; and
      the obtained value of the reward function representing an impact of execution of the selected action on performance of the task by the environment.

7. A method as claimed in claim 1, wherein using a RL process to obtain predicted values of a reward function representing possible impacts of execution of the possible action on performance of the task by the environment comprises using the RL process to predict values of the reward function on the basis of the obtained representation of the state of the environment and the possible action.

8. A method as claimed in claim 7, wherein using the RL process to predict a value of the reward function comprises using a trained Machine Learning, ML, model by:
   inputting the obtained representation of a current state of the environment to the trained ML model, wherein the trained ML model processes the representation in accordance with parameters of the ML model that have been set during training, and outputs a vector of predicted reward values corresponding to the possible future states that may be entered by the environment on execution of the possible action.

9. A method as claimed in claim 8, wherein the trained ML model is specific to the environment.

10. A method as claimed in claim 1, wherein obtaining a risk contour associated with the possible action comprises:
    receiving the risk contour from a server node.

11. A method as claimed in claim 1, wherein selecting, from among the possible actions and on the basis of the obtained predicted values of the reward function and risk contours, an action for execution on the environment comprises:
    inputting, to a selection function, for each of the plurality of possible actions that may be executed on the environment in its current state:
       the probabilities of the environment entering possible future states on execution of the action;
       the representations of a domain level consequence of the environment entering the possible future states;
       the obtained predicted values of the reward function representing possible impacts of execution of the possible action on performance of the task by the environment; and
       parameter values based on the confidence values associated with the probabilities; wherein the selection function outputs a favorability measure for each of the plurality of possible actions that may be executed on the environment in its current state.

12. A method as claimed in claim 11, wherein selecting, from among the possible actions and on the basis of the obtained predicted values of the reward function and risk contours, an action for execution on the environment further comprises:

selecting the possible action that is associated with the highest favorability measure.

13. A method as claimed in claim 11, wherein the parameter values based on the confidence values associated with the probabilities comprise exploration bonus values based on the confidence values, and wherein an exploration bonus value increases as the confidence value on which it is based decreases.

14. A method as claimed in claim 11, wherein the selection function comprises a weighted sum.

15. A method as claimed in claim 11, wherein the selection function comprises an ML model.

16. A method as claimed in claim 1, further comprising:
for confidence values included in risk contours for possible actions:
generating from the confidence value an exploration bonus value, such that the exploration bonus value increases with decreasing confidence value.

17. A method as claimed in claim 1, further comprising:
obtaining a measure of success of the selecting of actions for execution on the environment; and
updating a process for selecting, from among the possible actions and on the basis of the obtained predicted values of the reward function and risk contours, an action for execution on the environment, on the basis of the obtained measure of success.

18. A method as claimed in claim 1, further comprising:
requesting, from a server node, risk contours for each of the plurality of possible actions that may be executed on the environment in its current state.

19. A method as claimed in claim 18, further comprising:
requesting, from the server node, risk contours for each of the plurality of possible actions that may be executed on the environment in its current state and for each of a plurality of possible actions that may be executed on the environment in possible future states following execution of a threshold number of actions on the environment.

20. A method as claimed in claim 1, further comprising:
receiving, from a server node, risk contours for each of the plurality of possible actions that may be executed on the environment in its current state and for each of a plurality of possible actions that may be executed on the environment in possible future states following execution of a threshold number of actions on the environment.

* * * * *